(12) United States Patent
Ikeno et al.

(10) Patent No.: US 7,421,214 B2
(45) Date of Patent: Sep. 2, 2008

(54) CENTRALIZED MONITORING SYSTEM AND METHOD FOR CONTROLLING THE SAME

(75) Inventors: Hideo Ikeno, Yokohama (JP); Hisashi Nakamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 246 days.

(21) Appl. No.: 11/421,803

(22) Filed: Jun. 2, 2006

(65) Prior Publication Data
US 2006/0277446 A1 Dec. 7, 2006

(30) Foreign Application Priority Data
Jun. 3, 2005 (JP) .............................. 2005-164868

(51) Int. Cl.
*G03G 15/00* (2006.01)
*G06F 3/00* (2006.01)
*H04N 1/00* (2006.01)

(52) U.S. Cl. .............................. 399/8; 358/1.15; 714/47
(58) Field of Classification Search ..................... 399/8, 399/9, 11, 81; 358/1.15; 714/47
See application file for complete search history.

(56) References Cited

U.S. PATENT DOCUMENTS

| | | | |
|---|---|---|---|
| 5,196,944 A | 3/1993 | Satake | 358/404 |
| 5,812,874 A | 9/1998 | Yamashita et al. | 710/10 |
| 6,459,504 B1 | 10/2002 | Murano et al. | 358/406 |
| 7,062,179 B2 * | 6/2006 | Ikeno | 399/8 |
| 2005/0281566 A1 * | 12/2005 | Kaneko | 399/8 |

FOREIGN PATENT DOCUMENTS

| | | |
|---|---|---|
| JP | 06-315059 | 11/1994 |
| JP | 2001-016393 | 1/2001 |

* cited by examiner

*Primary Examiner*—Sophia S Chen
(74) *Attorney, Agent, or Firm*—Fitzpatrick, Cella, Harper & Scinto

(57) ABSTRACT

A centralized monitoring system for managing maintenance information of an image forming apparatus has a database for registering a device identifier, to identify a device including an image forming apparatus or a local monitoring apparatus that goes between said image forming apparatus and a server system, as master information. The centralized monitoring system obtains the device identifier communicated from the device. In response to the obtaining of the device identifier, the centralized monitoring system responds to the notifying device to communicate the maintenance information indicating an operating status of the image forming apparatus, even if the obtained device identifier is not registered in the database. Then, if it is determined that the obtained device identifier is not registered in the database, the centralized monitoring system determines whether the device identifier is registered in the database or not.

19 Claims, 32 Drawing Sheets

FIG. 12

FILE(F) EDIT(E) DISPLAY(V) BOOKMARK(A) TOOL(T) HELP(H)
◄BACK ▶ ⊗ ⌂ | 🔍SEARCH 📖BOOKMARK ⊕MEDIA ⊙ | 🖨 📄 ▼
ADDRESS(D) | ▲↗TRANSFER
LINK ☐Windows ☐FREE Hotmail SERVICE ☐Windows MEDIA ☐CUSTOMIZE THE LINK

- CUSTOMER MAINTENANCE
  - CUSTOMER
  - ADMINISTRATOR
  - LOCAL MONITORING APPARATUS
  - INVENTORY INFORMATION
- DEVICE
  - COMMODITY INFORMATION
  - UPDATE INFORMATION
  - COMMUNICATION TEST

MAINTENANCE DEVICE MASTER
◄Back ▸ List Location Consumables
[New] [Save] [Copy] [Delete]

* Using at the Customer Portalfields
* Active / Inactive : [Inactive ▼] — 1204
1201 { * DEVICE IDENTIFIER : [          ] [Device Name]
       * Device Name : ⊙No ○Yes
1202 { Embedded : [       ▼]
       Embedded Version :
       * Customer Name :
1203 { * MONITORING APPARATUS ID : [AAA00000001▼] — 1205
       * Location : [Default Location 184 ▼]
       * Model Name :
       Contract Category :
       * Address Location : [Address Location]
       * Building Device : [          ]
       Address1 : [246]
       Address2 : [246]
       Address3 : [246]
       Address4 : [246]
       Zip Code : [111]
       * Country : [Japan ▼]

📄 PAGE DISPLAYED | 💻 MY COMPUTER

FIG. 14B

| MONITORING APPARATUS ID | YERW721109 |
|---|---|

FIG. 15A

<MASTER INFORMATION>

| MONITORING APPARATUS ID 1501 | DEVICE IDENTIFIER 1502 | SALES COMPANY 1503 | CUSTOMER ID 1504 | IP ADDRESS 1505 | MONITORING SCHEDULE 1506 | MONITORING DETAIL 1507 |
|---|---|---|---|---|---|---|
| ABCD123456 |  | JP001 | 000000001 | 123.55.25.99 | · | · |
|  | TFTF321703 | JP001 | 000000001 | 123.55.25.111 |  |  |
|  | AAAA657804 | JP001 | 000000001 | 123.55.25.112 |  |  |
|  | ETRY399805 | JP001 | 000000001 | 123.55.25.113 |  |  |
| MONITORING APPARATUS ID | DEVICE IDENTIFIER | SALES COMPANY | CUSTOMER ID | IP ADDRESS | MONITORING SCHEDULE | MONITORING DETAIL |
| DDDD873567 |  | JP001 | 000000001 | 123.55.25.100 | · | · |
|  | QSFG644606 | JP001 | 000000001 | 123.55.25.114 |  |  |
|  | UUUK553107 | JP001 | 000000001 | 123.55.25.128 |  |  |
| MONITORING APPARATUS ID | DEVICE IDENTIFIER | SALES COMPANY | CUSTOMER ID | IP ADDRESS | MONITORING SCHEDULE | MONITORING DETAIL |
| XXYT888222 |  | JP001 | 000000001 | 200.128.80.5 | · | · |
|  | ABCD123401 | JP001 | 000000001 | 200.128.80.11 |  |  |
|  | TTTT122202 | JP001 | 000000001 | 200.128.80.12 |  |  |

<MASTER INFORMATION>

| MONITORING APPARATUS ID | DEVICE IDENTIFIER | SALES COMPANY | CUSTOMER ID | IP ADDRESS | MONITORING SCHEDULE | MONITORING DETAIL |
|---|---|---|---|---|---|---|
| ABCD123456 | | JP001 | 000000001 | 123.55.25.99 | · | · |
| | TFTF321703 | JP001 | 000000001 | 123.55.25.111 | | |
| | AAAA657804 | JP001 | 000000001 | 123.55.25.112 | | |
| | ETRY399805 | JP001 | 000000001 | 123.55.25.113 | | |
| DDDD873567 | | JP001 | 000000001 | 123.55.25.100 | · | · |
| | QSFG644606 | JP001 | 000000001 | 123.55.25.114 | | |
| | UUUK553107 | JP001 | 000000001 | 123.55.25.128 | | |
| | DDDD873508 | JP001 | 000000001 | 123.55.25.155 | | |
| XXYT888222 | | JP001 | 000000001 | 200.128.80.5 | · | · |
| | ABCD123401 | JP001 | 000000001 | 200.128.80.11 | | |
| | TTTT122202 | JP001 | 000000001 | 200.128.80.12 | | |
| YERW721109 | | JP001 | 000000002 | 177.20.199.7 | ⋯ | ⋯ |
| | YERW721109 | JP001 | 000000002 | 177.20.199.7 | | |

1510
1511

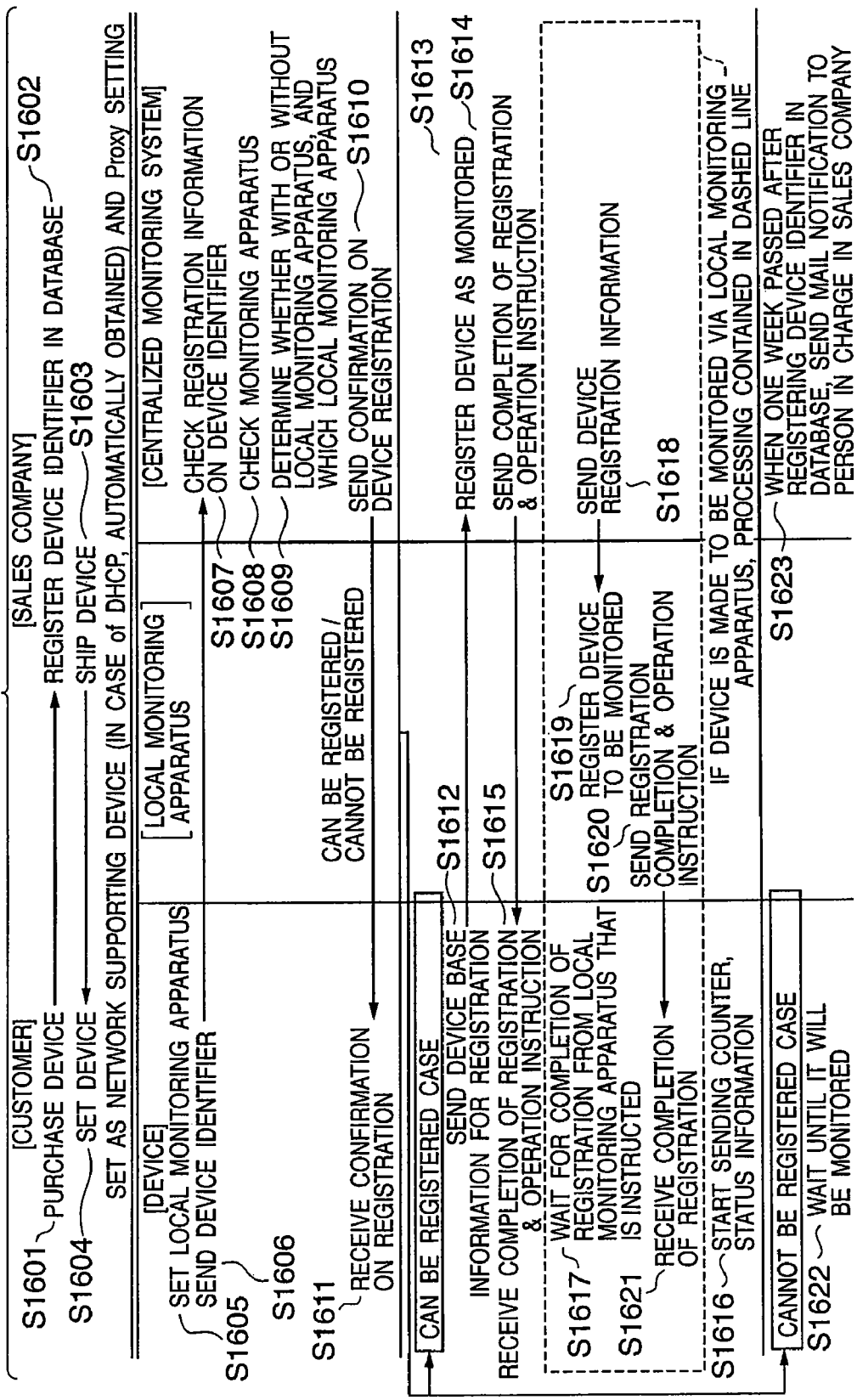

FIG. 17B

| DEVICE IDENTIFIER | DDDD873508 |
|---|---|
| LOCAL MONITORING APPARATUS LIST | 123.55.25.99 |
| | 123.55.25.100 |

F I G. 19B

| DEVICE IDENTIFIER | IP ADDRESS |
|---|---|
| QSFG644606 | 123.55.25.144 |
| UUUK553107 | 123.55.25.128 |
| DDDD873508 | 123.55.25.165 |
| ⋮ | |

<SETTING INFORMATION>

| MONITORING APPARATUS ID | IP ADDRESS | Type |
|---|---|---|
| AIJY3001 | 150.2.25.7 | 1 |

2102 — 2103 — 2104 (header 2101)

| MONITORING APPARATUS ID | DEVICE IDENTIFIER | MAC ADDRESS | IP ADDRESS | Type | MODEL NAME | OFFSET |
|---|---|---|---|---|---|---|
| AIJY3001 | 80MM12345 | 001AFC301 | 150.2.25.31 | 1 | MFP C7010 | 0 |
| AIJY3001 | 80MM12346 | 001AFC302 | 150.2.25.33 | 1 | MFP C7010 | 0 |
| AIJY3001 | 80MM12347 | 001AFC303 | 150.2.25.34 | 1 | MFP C7010 | 0 |
| AIJY3001 | 80MM12348 | 001AFC304 | 150.2.25.50 | 1 | MFP C7010 | 0 |
| AIJY3001 | 80MM12349 | 001AFC305 | 150.2.25.51 | 1 | MFP C7010 | 0 |

2106 — 2107 — 2108 — 2109 — 2110 — 2111 — 2112 (header 2105)

<COMMUNICATION TEST RESULT>

| MONITORING APPARATUS ID | STATUS |
|---|---|
| AIJY3001 | OK |

2114 — 2115 (header 2113)

FIG. 23

<MASTER INFORMATION>    2301

| MONITORING DEVICE ID | SALES COMPANY ID | IP ADDRESS | Type | MONITORING SCHEDULE | MONITORING DETAIL |
|---|---|---|---|---|---|
| ABCD0110 | JP001 | 10.30.2.2 | 1 | Weekly / 05 / 0010 | 11111111 |
| 80MM7Y37P | JP001 | 10.50.1.1 | 2 | Weekly / 01 / 2355 | 11111111 |
| 80MM1H35U | JP001 | 100.1.50.3 | 2 | Daily / 1200 | 01000111 |
| AIJY3001 | US502 | 150.2.25.7 | 1 | Daily / 1200 | 11110001 |
| 2302 | 2303 | 2304 | 2305 | 2306 | 2307 |

2308

| MONITORING DEVICE ID | DEVICE IDENTIFIER | MAC ADDRESS | IP ADDRESS | Type | MODEL NAME | OFFSET |
|---|---|---|---|---|---|---|
| ABCD0110 | 80MM5T96A | 001A7BFF03 | 10.30.2.20 | 1 | MFP 8000 | 0 |
| ABCD0110 | 80MM8D21N | 001ACC5200 | 10.30.2.55 | 1 | MFP 2500 | 12000 |
| ABCD0110 | 80LL2U66L | 001A374A0A | 10.30.2.94 | 1 | PRT 9000 | 0 |
| 80MM7Y37P | 80MM7Y37P | 001ADC38FE | 10.50.1.1 | 2 | MFP C3300 | 0 |
| 80MM1H35U | 80MM1H35U | 001AE1A1B1 | 100.1.50.3 | 2 | MFP 7770 | 0 |
| 2309 | 2310 | 2311 | 2312 | 2313 | 2314 | 2315 |

FIG. 26

(MASTER CHANGE INFORMATION)

2601

| MONITORING APPARATUS ID | SALES COMPANY ID | Type | SCHEDULE | MONITORING DETAIL |
|---|---|---|---|---|
| ABCD0110 | JP001 | 1 | Daily / 1200 | 11111111 |

2602　2603　2604　2605　2606

2607

| MONITORING APPARATUS ID | DEVICE IDENTIFIER | MAC ADDRESS | IP ADDRESS | Type | MODEL NAME | OFFSET |
|---|---|---|---|---|---|---|
| ABCD0110 | 80MM5T96A | 001A7BFF03 | 10.30.2.20 | 1 | MFP 8000 | 0 |
| ABCD0110 | 80MM8D21N | 001ACC5200 | 10.30.2.55 | 1 | MFP 2500 | 12000 |
| ABCD0110 | 80LL2U66L | 001A374A0A | 10.30.2.94 | 1 | PRT 9000 | 0 |
| ABCD0110 | 80MM5B11J | 001ABC7100 | 10.30.2.100 | 1 | MFP C3000 | 0 |
| ABCD0110 | 80MM5B13J | 001ABC8131 | 10.30.2.101 | 1 | MFP C3000 | 0 |

2608　2609　2610　2611　2612　2613　2614

CENTRALIZED MONITORING SYSTEM AND METHOD FOR CONTROLLING THE SAME

FIELD OF THE INVENTION

The present invention relates to a technique for managing maintenance information on an image forming apparatus via a network such as the Internet.

BACKGROUND OF THE INVENTION

A maintenance system for collectively managing a plurality of devices at a remote service center has been known. Functions of the maintenance system include a function of remotely monitoring maintenance information such as a failure in a device, and when a failure occurs, a function of dispatching a service person, or a function of monitoring an operating status of the device such as the number of prints.

When the maintenance service starts, a service center needs to identify the device to be monitored. If the device wants to receive a maintenance service but the device cannot be identified at the service center, the device cannot be monitored. Therefore, a request for starting a maintenance service on the device side and identification of the device on the service center side need to be synchronized.

A technique for solving the problem is disclosed in Japanese Patent Laid-Open No. 06-315059, for example.

In Japanese Patent Laid-Open No. 06-315059, a copying machine requests to start the service to a host with a password and a copying machine ID. Then, if the informed ID cannot be authenticated, the host replies to the copying machine that the password cannot be authenticated. The copying machine that received the reply issues a setup request to the host. The host that received the request registers the ID and the like, replies to the copying machine as such and sets up the copying machine. In Japanese Patent Laid-Open No. 06-315059, as a copying machine is additionally set, the copying machine is automatically set up when setting is done at the copying machine. Thus, Japanese Patent Laid-Open No. 06-315059 provides an advantage in that it eliminates registering processing by an operator at the host.

Japanese Patent Laid-Open No. 2001-016393 discloses a system of informing a request to start a service command to a service center via a modem when the request to start a service is indicated via a panel of a copying machine, and if the model and the serial number of the informing copying machine is determined to have been set at the service center, sending a reply indicating as such and appropriately finishing the request to start a service.

Conventional techniques, however, have the problems set out below.

Whether a setting with respect to a device such as an identifier or the like (for example, a copying machine) is automatically done or manually done, a service center allows a maintenance service of the device to participate in sync with the completion of the setting.

In other words, unless setting for a device that synchronized to the device mentioned above is done, the device is not allowed to participate in the maintenance service even if a device setting worker has done the setting operation for the device. In some cases, a worker needs to do quite complicated operation as the worker needs to do setting operation on another day again.

In the technique disclosed in Japanese Patent Laid-Open No. 06-315059, setting about a maintenance service is automatically done at a service center. If an unauthorized device accesses the service center, the device is forced to participate in the maintenance service. That is a problem with respect to security.

SUMMARY OF THE INVENTION

The present invention intends to provide a system for executing setting operation of a maintenance service more correctly without requiring to synchronizing additional setting at the device and setting for the device at the service center.

According to one aspect of the present invention, there is provided a centralized monitoring system for managing maintenance information of an image forming apparatus, comprising: a database unit adapted to register a device identifier, as master information, that identifies a device including an image forming apparatus or a local monitoring apparatus that goes between the image forming apparatus and a server system; an obtaining unit adapted to obtain a device identifier informed from the device; a responding unit adapted to, in response to obtainment of the device identifier by the obtaining unit, respond to a notification source device so that the notification source device communicates maintenance information indicating an operation status of the image forming apparatus even if the obtained device identifier is not registered in the database unit; and a re-determination unit adapted to determine whether the device identifier is registered in the database unit again after it is determined that the obtained device identifier is not registered in the database unit.

Also, according to another aspect of the present invention, there is provided a method of controlling a centralized monitoring system for managing maintenance information of an image forming apparatus by using a database unit for registering a device identifier, as master information, that identifies a device including an image forming apparatus or a local monitoring apparatus that goes between the image forming apparatus and a server system, comprising: an obtaining step of obtaining a device identifier informed from the device; a responding step of, in response to obtainment of the device identifier in the obtaining step, responding to a notification source device so that the notification source device communicates maintenance information indicating an operation status of the image forming apparatus even if the obtained device identifier is not registered in the database unit; and a re-determination step of determining whether the device identifier is registered in the database unit again after it is determined that the obtained the device identifier is not registered in the database unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a block diagram showing an example of a hardware configuration of hosts 102, 107 and 111a;

FIG. 12 is a diagram showing a display example of a setting screen (web browser) corresponding to the processing at S1011 of FIG. 10;

FIG. 14B is a diagram showing an example of the contents of notification informed from the device to the centralized monitoring system when an indication to execute a communication test is issued;

FIGS. 15A and 15B are diagrams showing exemplary registration of the master registration information to be registered in the database 112 of the centralized monitoring system 111;

FIG. 16 is a diagram showing an outline of a sequence over the entire system of the second embodiment when a new device is set at a customer side;

FIG. 17B is a diagram showing an example of a registering request informed to the centralized monitoring system 111;

FIG. 19B is a diagram showing an example of data arrangement of a monitoring device information table saved by the local monitoring apparatus (123);

FIG. 21 is a diagram showing arrangement examples of data on setting information according to the third embodiment;

FIG. 23 is a diagram showing registration of master registration information which the centralized monitoring system saves in a database and references at the step S2202 of FIG. 22;

FIG. 26 is a diagram showing examples of master changing information to be received by the centralized monitoring system.

DETAILED DESCRIPTION OF THE PREFERRED EMBODIMENTS

The preferred embodiments of the present invention will now be described in detail in accordance with the accompanying drawings.

First Embodiment

Figure 1:
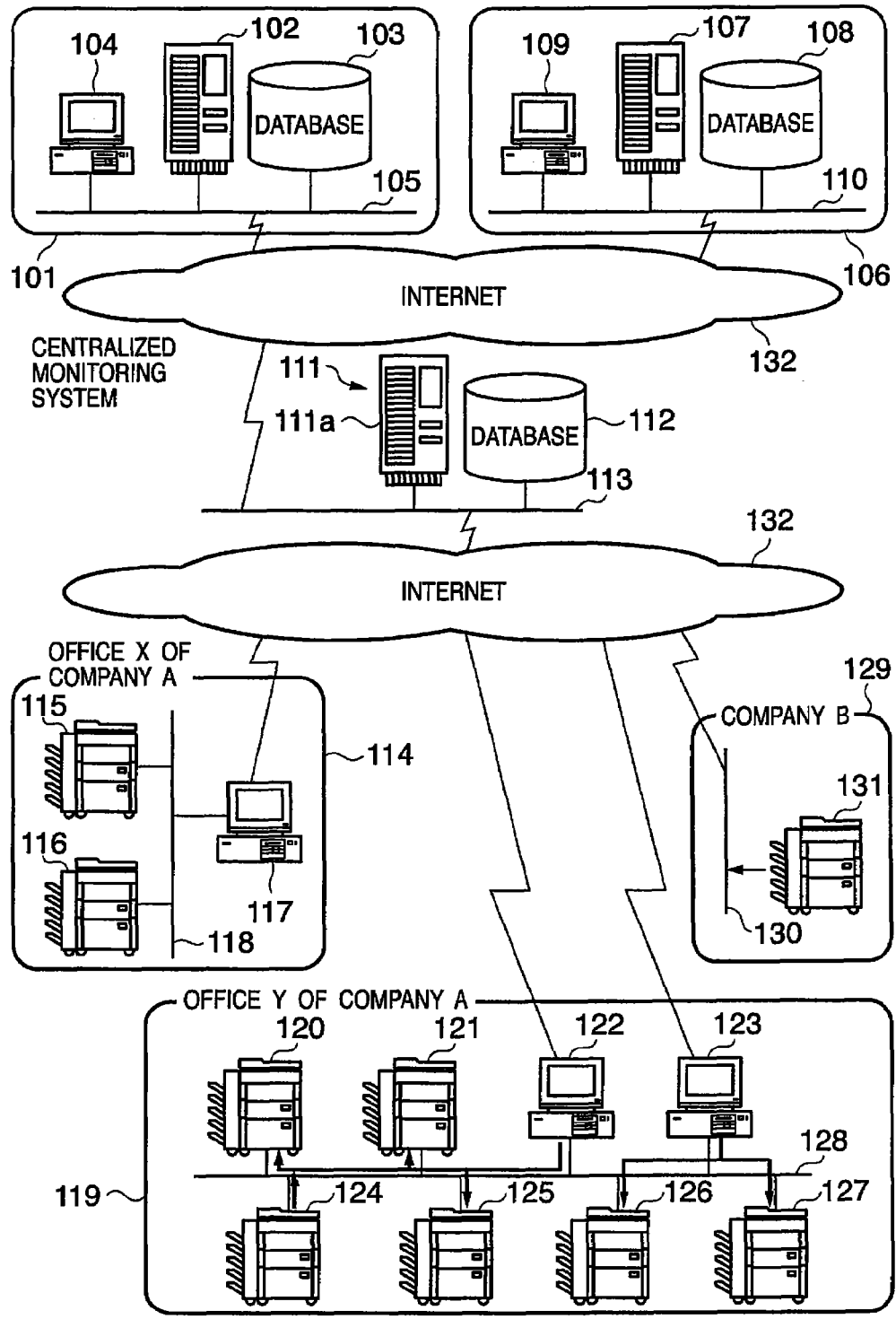
FIG. 1 is a diagram of the overall entire system of a preferred embodiment.

FIG. 1 is a diagram showing the overall arrangement of the entire system of this embodiment.

First, this system is connected to a plurality of systems from sales companies including a system 101 and a system 106. The systems 101 and 106 include databases 103 and 108 for storing respective cover areas and/or sales information of customers or information on a monitoring system, respectively.

The sales companies' systems 101 and 106 also include PCs 104 and 109 for controlling registration or correction of data to hosts 102 and 107 and viewing the data by accessing WEB sites provided by a centralized monitoring system 111. By equipping an operation unit and a display unit to the hosts 102 and 107, the system can be adapted to play roles of the PCs 104 and 109.

In the system 101, the host 102 the database 103 and the PC 104 are connected to each other via a LAN 105. In the system 106, the host 107, the database 108 and the PC 109 are connected to each other via a LAN 110.

In FIG. 1, each of the systems from sales companies is shown as consisting of a plurality of apparatuses. Each system, however, only needs to achieve each function below. For example, the databases 103 and 108 may be physically present in the hosts 102 and 107. Further, the databases 103 and 108 may be present at the other places if the databases are accessible from the hosts 102 and 107 via the Internet. That is to say, the system may consist of one or a plurality of devices.

As shown in FIG. 1, the centralized monitoring system 111 for managing maintenance information on an image forming apparatus is present between the sales company and the customer. The host 111a is a computer for controlling the centralized monitoring system. The database 112 stores a device identifier for identifying a device including an image forming apparatus or a local monitoring apparatus that goes between the image forming apparatus and a server system as master information. The database 112 stores information for monitoring a device, a counter of an image forming apparatus collected from a customer, or maintenance information such as failure information. The host 111a and the database 112 are connected to each other via a LAN 113, which can be connected to the Internet 132. The database 112 may be physically present in the host 111a. If the database 112 is accessible from the host 111a via the Internet 132, it may be in another place. Although FIG. 1 shows a case where the centralized monitoring system 111 consists of a computer and a database, it may consist of a plurality of computers and/or databases. That is to say, a plurality of centralized monitoring systems and databases may be adapted to perform distributed processing for the purpose of load sharing in collecting information from many image forming apparatuses and local monitoring apparatuses.

The centralized monitoring system 111 has functions of collecting (obtaining), storing, processing maintenance information on an image forming apparatus that is monitored by the local monitoring apparatuses 117, 122 and 123 (to be described later) or the image forming apparatus 131 (to be described later) and providing the processed information outside the system. For example, the centralized monitoring system 111 has a function of distributing the information to the hosts 102 and 107. The maintenance information includes the number of prints for each size of sheets (counter value), failure information such as a jam, remaining amount of toner/ink, a scan counter value, and firmware/program version information. The maintenance information also includes various types of information that is required when maintenance of an image forming apparatus is executed for a setting place, a device identifier, customer information or the like at the centralized monitoring system.

Information on an image forming apparatus to be monitored or setting about the monitoring can be registered from the hosts 102 and 107 to the centralized monitoring system 111. More specifically, an operator displays a WEB page provided by the centralized monitoring system 111 on the PC 104 or 109 and does setting. The centralized monitoring system 111 collectively manages the image forming apparatuses to be monitored and settings about the monitoring, which are registered from each of the hosts. The centralized monitoring system 111 can also does setting for the monitoring to the local monitoring apparatuses 117, 122, 123 or the image forming apparatus 131.

The centralized monitoring system 111 provides a WEB page for an operator to view information stored in the database 112 or processed information to the PC (not shown), which is connected thereto via the Internet. The WEB page limits the contents for a user to view for each sales company, for each customer or for each user authority, according to user authentication. The centralized monitoring system 111 also enables for a user to change a part of data from the WEB page. That is to say, the WEB page provided by the centralized monitoring system 111 can be viewed not only from the customer environment but also from a PC with a WEB browser (not shown) if the PC is directly connects with the centralized monitoring system 111 via the Internet 132.

Next, a system configuration on a customer's side will be described. A plurality of environments can be considered as the customer environment. In FIG. 1, the customer systems 114, 119 and 129 are exemplified.

In the customer system 114 (the office X of the company A), the image forming apparatuses 115 and 116 connected to the LAN 118 are monitored by the local monitoring apparatus 117. The local monitoring apparatus 117 communicates with the centralized monitoring system 111 via the Internet 132. In the customer system 119 (the office Y of the company A), image forming apparatuses on the LAN 128 are managed by the local monitoring apparatuses 122 and 123. In the example shown, the local monitoring apparatus 122 manages the image forming apparatuses 120, 121 and 125, while the local monitoring apparatus 123 manages the image forming apparatuses 126 and 127, respectively. The image forming apparatus 124 is an apparatus to be set in the system.

The local monitoring apparatuses 117, 122 and 123 stores information collected from the monitored image forming apparatuses and save the processing result of the stored data to a database (not shown). A setting about the monitoring of the image forming apparatus is also saved in a database (not shown). The database (not shown) may be an independent database connected on the LANs 118 and 128. If the database is accessible from the local monitoring apparatuses 117, 122 and 123 via the Internet, the database may be present at another place.

In the customer system 129 (the company B), the image forming apparatus 131 connected to the LAN 130 connected to the Internet is directly communicating with the centralized monitoring system 111 via the Internet. That is to say, the image forming apparatus 131 actively sends information on itself to the centralized monitoring system 111.

In the system mentioned above, the points below should be noted.

(1) In communication via the Internet in the configuration mentioned above, at least the HTTP/SOAP protocol is available.

(2) In the above description, each image forming apparatus in the company A communicates with the centralized monitoring system 111 via a local monitoring apparatus. Each image forming apparatus in the company A can also communicate with the centralized monitoring system without the need for a local monitoring apparatus as the image forming apparatus 131 set at the company B if a setting changes as such.

(3) SMTP (electronic mail) can be used as communication means between a local monitoring apparatus and a centralized monitoring system. However, in order to communicate by electronic mail, a mail server, a POP server or the like need to be set. That loads the system to set the servers. Furthermore, an e-mail sometimes causes a problem in security such as receiving an unauthorized mail. On the other hand, by accessing and making a session from the device to the centralized monitoring system in a SOAP communication by the HTTPS protocol, the security problem can be solved and the requirement of setting a mail server and a POP server is eliminated.

Figure 2:
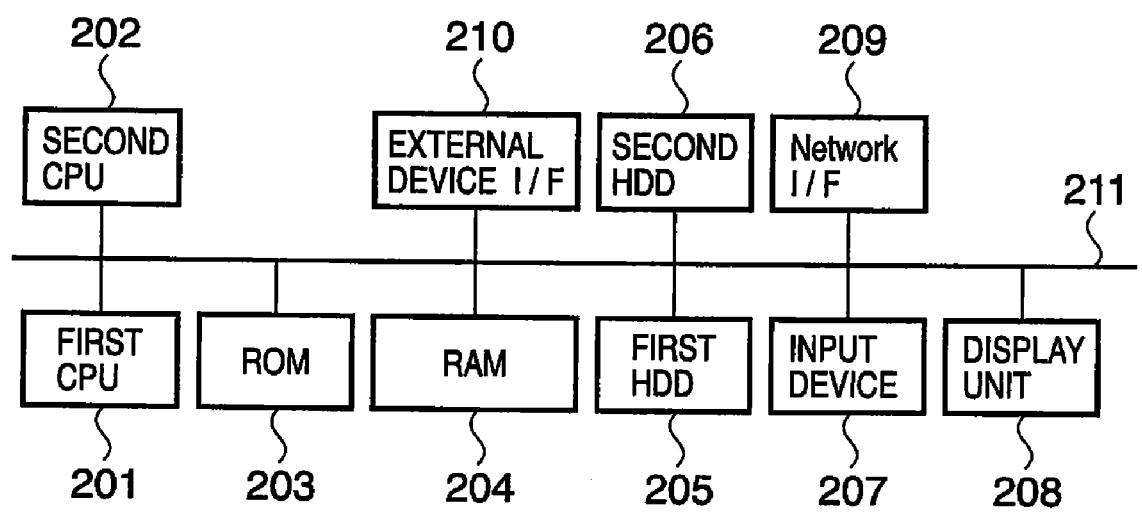

FIG. 2 is a block diagram showing an example of a hardware configuration of hosts 102 and 107 and a host 111a in a centralized monitoring system 111.

In FIG. 2, a first CPU 201 and a second CPU 202 execute various types of processing in the device. ROM 203 is read only memory for storing a program or data with respect to each type of processing of the apparatus. RAM 204 is memory which can electrically store and rewrite temporary data with respect to each type of processing of the apparatus. A first HDD 205 and a second HDD 206 are hard disks as rewritable storage media. The first HDD 205 and the second HDD 206 store a program or data with respect to various types of processing of the apparatus, and temporary data, information on the monitored image forming apparatus according to the embodiment and information collected from the image forming apparatus. An input device 207 has a keyboard or a pointing device for accepting indication inputted to the apparatus. A display unit 208 displays an operation status of the apparatus or information outputted by each program operating on the apparatus. Network I/F 209 is connected to a LAN or the Internet and exchanges information with external devices. An external device I/F 210 connects an external memory device and the like. The configurations mentioned above are connected with each other by a system bus 211 and exchange data with each other.

Figure 3:
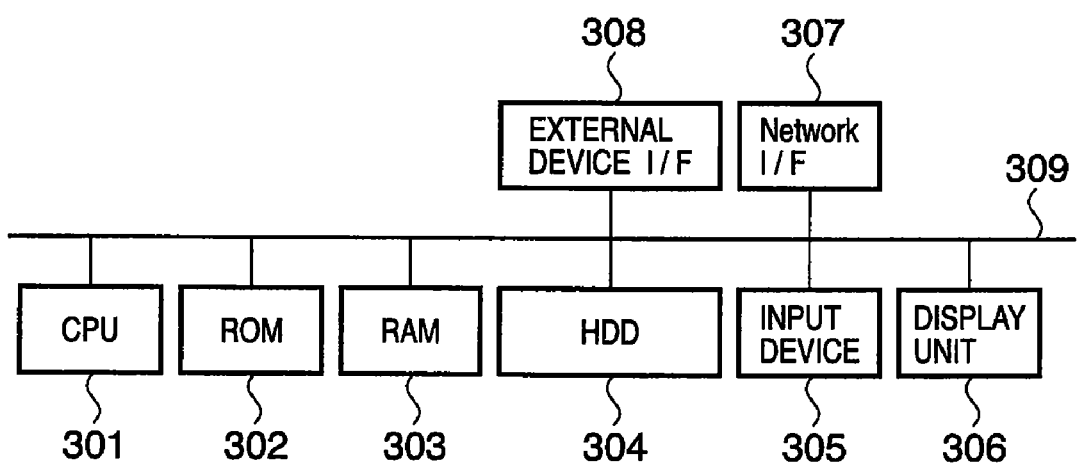
FIG. 3 is a block diagram showing an example of a hardware configuration of local monitoring apparatuses 117, 122, 123, and PCs 104 and 109.

FIG. 3 is a block diagram showing an example of a hardware configuration of local monitoring apparatuses 117, 122, 123, and PCs 104 and 109. In FIG. 3, a CPU 301 controls over respective types of processing on the apparatus. ROM 302 is read only memory for storing a program or data with respect to each type of processing of the apparatus. RAM 303 is memory which can electrically store and rewrite temporary data with respect to each type of processing of the apparatus. An HDD 304 is a hard disk as a rewritable storage media. The HDD 304 stores a program or data and temporary data with respect to various types of processing of the apparatus, information on the monitored image forming apparatus according to the embodiment and information collected from the image forming apparatus. In the PCs 104 and 109, a WEB browser and the like are stored in the HDD 304. An input device 305 includes a keyboard and a pointing device for accepting indication inputted to the apparatus. A display unit 306 displays an operation status of the apparatus or information outputted by each program operating on the apparatus. Network I/F 307 is connected to a LAN and the Internet and exchanges information with external devices. An external device I/F 308 connects an external memory device and the like. The configurations mentioned above are connected with each other by a system bus 309 and exchange data with each other.

Figure 4:
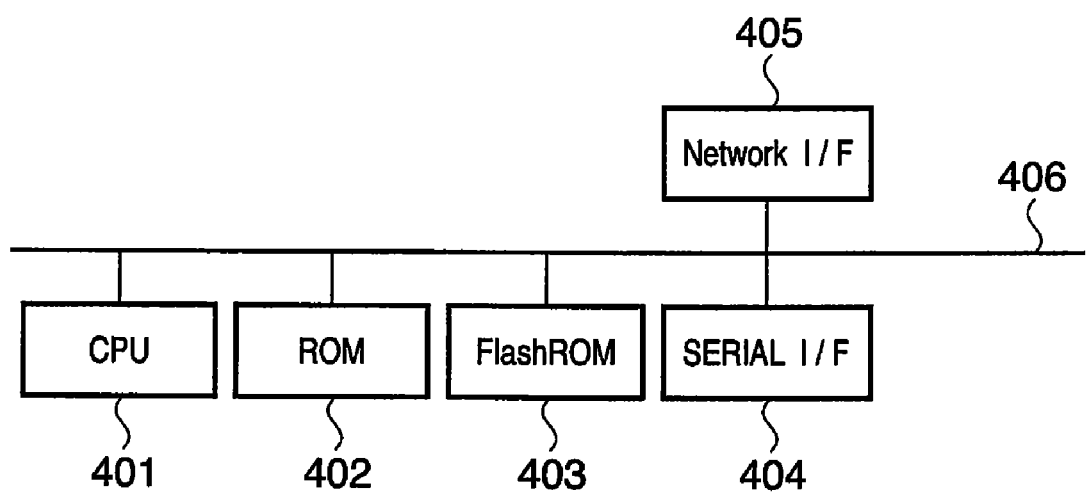
FIG. 4 is a block diagram showing an example of a hardware configuration in another embodiment of local monitoring apparatuses 117, 122 and 123.

FIG. 4 is a block diagram showing an example of a hardware configuration of local monitoring apparatuses 117, 122 and 123 in another embodiment. That configuration is different from those shown in FIGS. 2 and 3 in that it has readable/writable FlashROM 403 for storing information and the like collected from an image forming apparatus.

In FIG. 4, a CPU 401 controls each type of processing on the apparatus. ROM 402 is read only memory for storing a program or data with respect to each type of processing of the apparatus. The FlashROM 403 is readable/writable memory for storing data with respect to each type of processing of the apparatus and temporary data, information on a monitored image forming apparatus and information collected from the image forming apparatus. A serial I/F 404 enables an external terminal to be connected by a serial cable. An error or a log outputted when a program on the apparatus is executed can be outputted outside the apparatus by the serial I/F 404. Network I/F 405 is connected to a LAN and the Internet and exchanges information with external devices. The configurations mentioned above are connected with each other by a system bus 406 and exchange data with each other.

Figure 5:
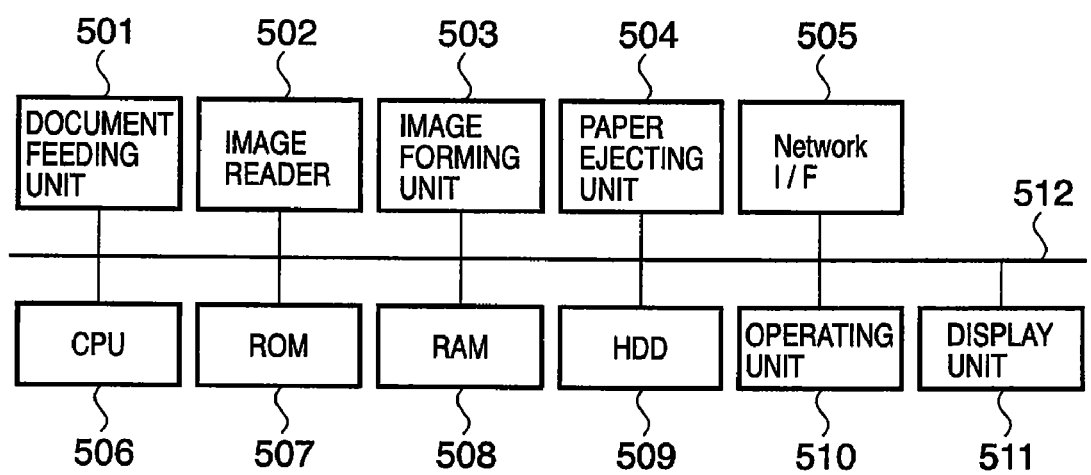
FIG. 5 is a diagram showing an example of a hardware configuration of image forming apparatuses 115, 116, 120, 121, 124, 125, 126, 127 and 131.

FIG. 5 is a diagram showing an example of a hardware configuration of image forming apparatuses 115, 116, 120, 121, 124, 125, 126, 127 and 131. As an image forming apparatus, a multifunction peripheral collectively provided with a printing function and a facsimile function, a printer (including an electric photograph system and an ink jet system) for receiving data from a PC or the like and printing the data, a scanner, a facsimile or the like can be exemplified. In FIG. 5, a configuration of a complex machine is shown as an example of an image forming apparatus.

A document feeding unit 501 feeds a document to be read into an image reader 502. The image reader 502 optically reads the document. An image forming unit 503 converts the document read by the image reader 502 and data received via a Network I/F 505 into print image data and prints the data. A paper ejecting unit 504 ejects sheets of paper printed by the image forming unit 503 and processes the sheets such as sorting or fixing them with staples. The Network I/F 505 connects to a LAN and the Internet and exchanges information with external devices. The CPU 506 controls over respective types of processing on the image forming apparatus. ROM 507 is a read only memory for storing a program or data with respect to each type of processing of the apparatus. RAM 508 is a memory which can electrically store and rewrite temporary data with respect to each type of processing of the apparatus. An HDD 509 is a hard disk as a readable/writable storage media and stores a program or data with respect to various types of processing of the apparatus and temporary data and user data sent to the apparatus. An operating unit 510 accepts indication inputted to the apparatus. A display unit 511 displays an operation status of the apparatus and information on operation to the operating unit 510. The configurations mentioned above are connected with each other by a system bus 512 and exchange data with each other.

The image forming apparatus 131 with a function for actively sending information for a device to monitor saves a program or data with respect to such processing of sending out monitoring data in the ROM 507 or the HDD 509.

Figure 6:
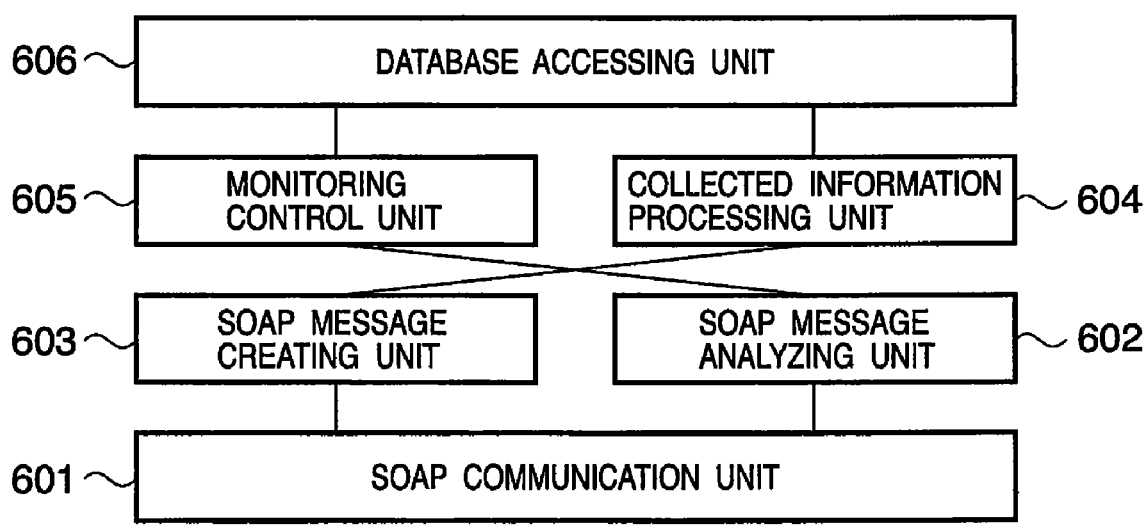
FIG. 6 is a block diagram showing an example of a software configuration that relates to an image forming apparatus monitoring system of the centralized monitoring system 111.

FIG. 6 is a block diagram showing an example of a software configuration that relates to an image forming apparatus monitoring system of the centralized monitoring system 111 (host 111a).

A SOAP communication unit 601 passes SOAP data received from the local monitoring apparatuses (117, 122, 123) or the image forming apparatuses (124, 131) via the Network I/F 209 to a SOAP message analyzing unit 602. The SOAP communication unit 601 sends SOAP data created by a SOAP message creating unit 603 to the local monitoring apparatuses or the image forming apparatuses via the Network I/F 209. A collected information processing unit 604 stores information received from the monitored local monitoring apparatuses or the monitored image forming apparatuses in the database 112 via a database accessing unit 606 as it is or after processing it.

The collected information processing unit 604 stores maintenance information received from the monitored local monitoring apparatus 117, 122, 123 or the monitored image forming apparatus 131 in the database 112 via a database accessing unit 606 as it is or after processing it. The collected information processing unit 604 has a function of detecting a validity check of a counter value of each image forming apparatus. For example, the collected information processing unit 604 can detect that the counter value extremely increases or decreases from the previously obtained value or that the counter value does not change. If such a state is detected, the centralized monitoring system 111 sends warning mail to outside the system or displays an alarm on an external operator's terminal device. The validity check function prevents an erroneous sum (erroneous charge) even if a wrong counter value is informed to the centralized monitoring system 111 due to some failure.

The collected information processing unit 604 realizes functions with respect to a remote monitoring system such as a function of informing a service person in charge or a customer side manager of a sum of counter information and error information based on information received from the monitored local monitoring apparatuses or the monitored image forming apparatuses and data stored in the database 112.

A monitoring control unit 605 manages a schedule for obtaining information of local monitoring apparatuses or image forming apparatuses or controls the monitored contents, a monitoring method and the like. Further, the monitoring control unit 605 sends necessary indication to the monitored local monitoring apparatuses or the monitored image forming apparatuses via a SOAP message creating unit 603, a SOAP communication unit 601 and the Network I/F 209.

Figure 7:
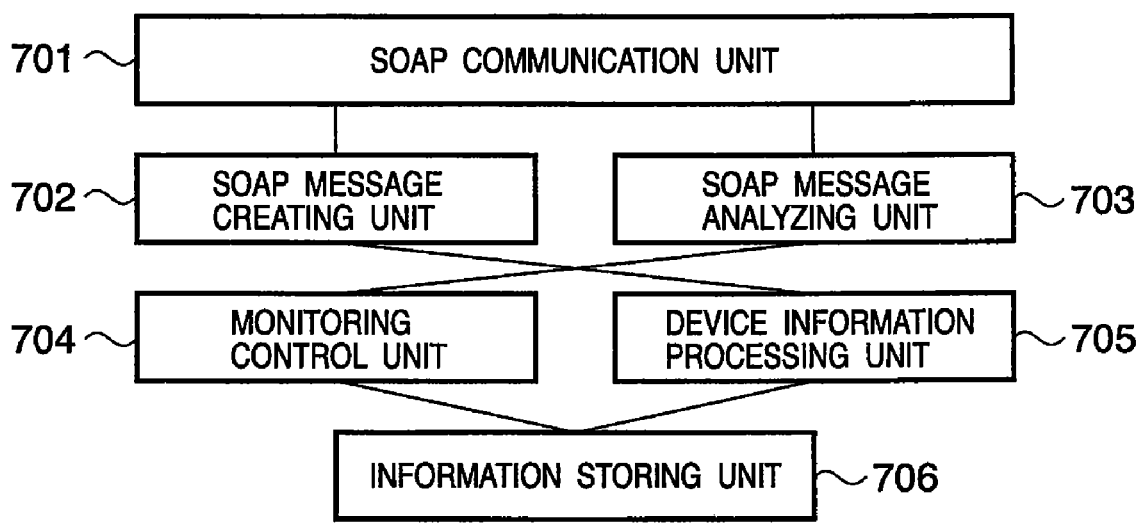
FIG. 7 is a block diagram showing an example of a software configuration that relates to an image forming apparatus monitoring system of the local monitoring apparatuses (117, 122, 123)

FIG. 7 is a block diagram showing an example of a software configuration that regards to an image forming apparatus monitoring system of the local monitoring apparatuses (117, 122, 123).

A SOAP communication unit 701 passes SOAP data received from the centralized monitoring system 111 via the Network I/F 307 (405) to a SOAP message analyzing unit 703. The SOAP communication unit 701 sends SOAP data created by a SOAP message creating unit 702 to the centralized monitoring system 111 via the Network I/F 307 (405). A monitoring control unit 704 updates information that specifies image forming apparatus monitored by the local monitoring apparatus saved in an information storing unit 706 according to monitor setting (to be described) from the centralized monitoring system 111. The monitoring control unit 704 manages a schedule to obtain information from the image forming apparatuses (115, 116, 120, 121, 125, 126, 127).

A device information processing unit 705 collects information from an image forming apparatus along a schedule managed by the monitoring control unit 704 or according to the state of the image forming apparatus. Information to be collected is maintenance information such as counter information, a service call or a jam, or toner shortage. The collected information is stored in the information storing unit 706. The device information processing unit 705 also has the same counter validity check function as that of the collected information processing unit 604 mentioned above.

Data stored in the information storing unit 706 is passed to the SOAP message creating unit 702 as it is via the device information processing unit 705 and to the centralized monitoring system 111. Alternatively, data stored in the information storing unit 706 is interpreted and processed in the device information processing unit 705, then passed to the SOAP message creating unit 702 and sent to the centralized monitoring system 111.

Figure 8:
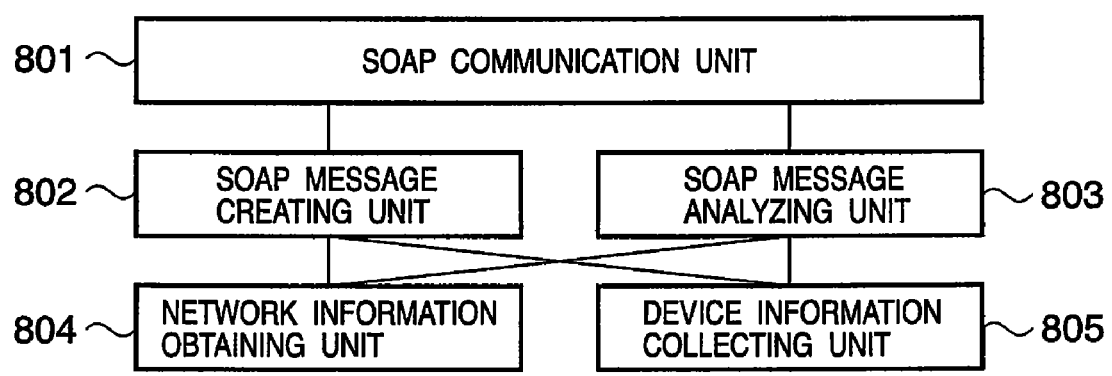
FIG. 8 is a block diagram showing an example of a software configuration of a part with respect to an image forming apparatus monitoring system in each of image forming apparatuses 115, 116, 120, 121, 124, 125, 126, 127 and 131.

FIG. 8 is a block diagram showing an example of a software configuration of a part with respect to an image forming apparatus monitoring system in each of image forming apparatuses 115, 116, 120, 121, 124, 125, 126, 127 and 131.

A SOAP communication unit 801 passes SOAP data received from the centralized monitoring system 111 via a Network I/F 505 to a SOAP message analyzing unit 803. The SOAP communication unit 801 sends SOAP data created by a SOAP message creating unit 802 to the centralized monitoring system 111 via the Network I/F 505. A network information obtaining unit 804 can automatically obtain an IP address, a DNS server, and a gateway address in the DHCP environment. If network information inputted from an operation unit 510 and saved in the HDD 509 is present, the network information obtaining unit 804 obtains the information. A device information collecting unit 805 obtains counter information to be saved in the device or information including a service call, a jam or a toner shortage occurred inside, according to a schedule in the complex machine or in response to an indication from the centralized monitoring system 111. The obtained data is passed to the SOAP message creating unit 802 as it is and sent to the centralized monitoring system 111. Alternatively, the obtained data is stored, interpreted and processed in the device information collecting unit 805, then passed to the SOAP message creating unit 802 and sent to the centralized monitoring system 111.

Figure 9:
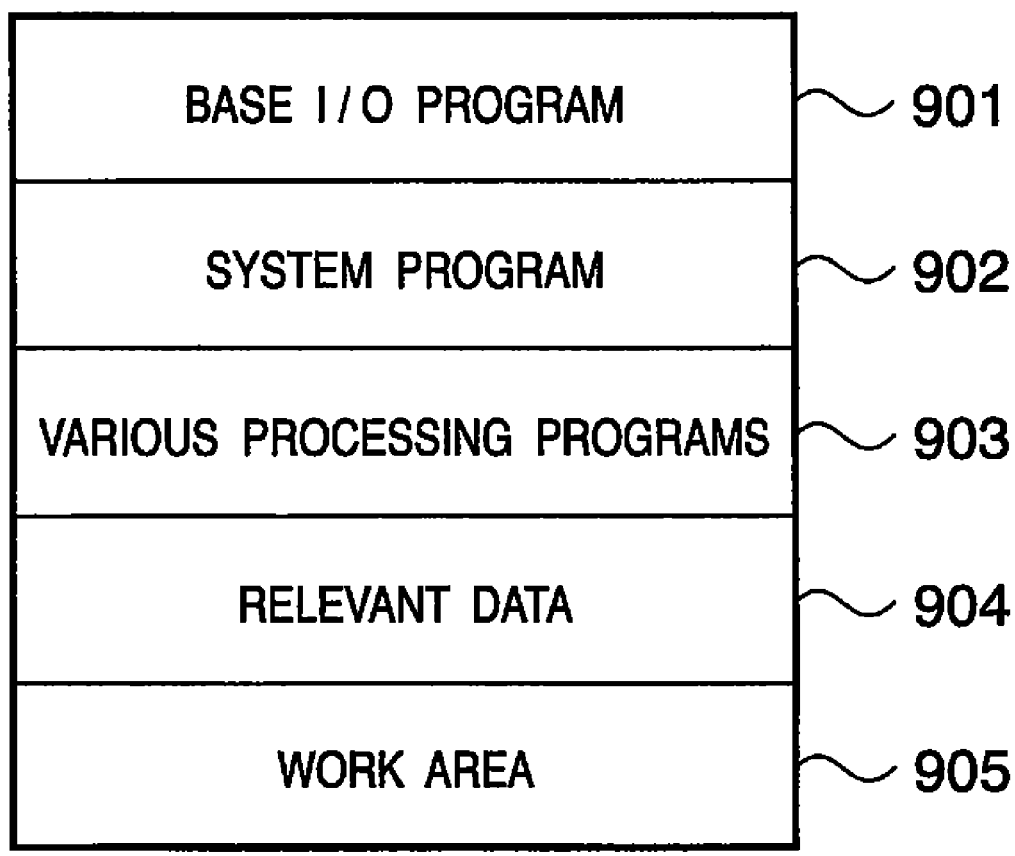
FIG. 9 is a diagram showing a memory map when a processing program according to the embodiment is loaded into memory to be executed.

FIG. 9 is a diagram showing a memory map when processing programs according to the embodiment is loaded into memory for execution in the centralized monitoring system 111, the local monitoring apparatuses 117, 122, 123, or the image forming apparatuses 115, 116, 120, 121, 124, 125, 126, 127 and 131. The processing programs are loaded into the RAM 204 in the centralized monitoring system 111, into the RAM 303 or the FlashROM 403 in the local monitoring system, and into the RAM 508 in the image forming apparatus, respectively.

As shown in FIG. 9, the memory map includes a base I/O program 901 for controlling input/output on the apparatus, a system program 902 for providing an operating environment for each of the processing programs, various processing programs 903 including a processing program of the embodiment, an area 904 for storing relevant data, and a work area 905 that is temporarily used when the various programs operate. If an area to be used as 901 to 905 comes short due to restriction on the capacity, a hardware disk may be used as a part of an area of RAM. That is to say, the first HDD 205 or the second HDD 206 can be treated as a part of an area of the RAM 204 in the centralized monitoring system, the HDD 304 can be treated as a part of an area of the RAM 303 in the local monitoring apparatus, and the HDD 509 can be treated as a part of an area of the RAM 508 in the image forming apparatus.

Figure 10:
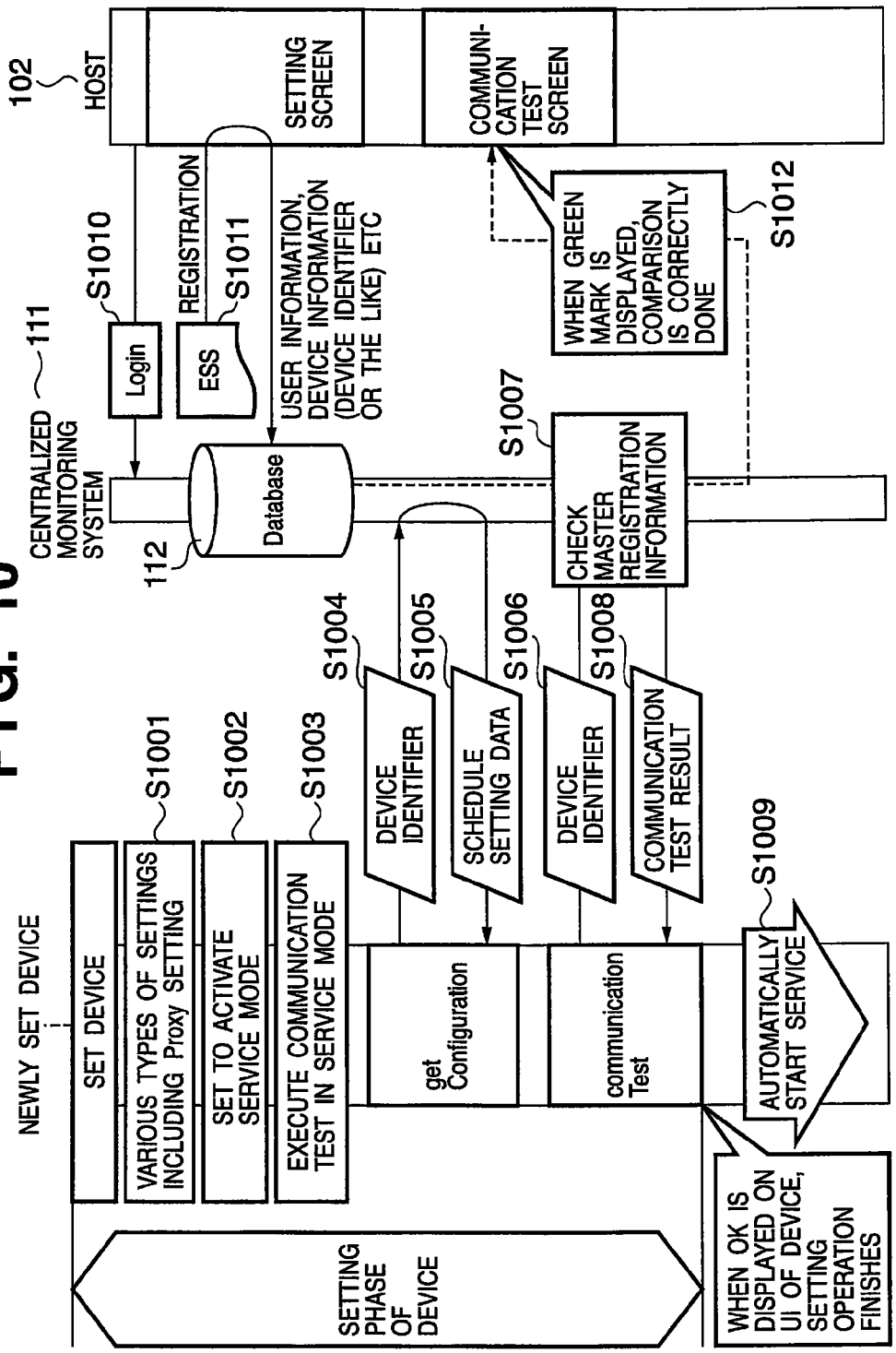
FIG. 10 is a diagram showing an outline of a sequence over the entire system of the first embodiment when a new device is set at a customer's side.

FIG. 10 shows an outline of a sequence over the entire system of the embodiment when a new device is set at a customer's side. The term "new device" here means any of the local monitoring apparatuses and the image forming apparatuses shown in FIG. 1. The term "device" in the description below collectively refers to an image forming apparatus and a local monitoring apparatus to be monitored by the centralized monitoring system 111 and can applies to any of them.

First in step S1001, various types of settings including proxy setting are done to a newly placed device. In step S1002, service mode effective setting is inputted to the device. In step S1003, an indication to execute a communication test with the centralized monitoring system 111 to the device is inputted in a state where the service mode is activated by input in step S1002.

In step S1004, a device identifier is informed from the device to the centralized monitoring system 111 according to the input instruction in step S1003. In the centralized monitoring system 111, the device identifier informed from the device is obtained. In step S1005, as a response to the information of the device identifier in S1004, schedule setting data is outputted to the device from the centralized monitoring system 111. The device receives the schedule setting data outputted from the centralized monitoring system 111 and stores the data in a storage unit (for example, if the device is the local monitoring apparatus, the data is stored in the HDD 304 or the FlashROM 403, and if the device is the image forming apparatus, in the HDD 509). The schedule setting data may include a device identifier outputted in step S1004 for the image forming apparatus on the receiving side to check itself for whether the schedule setting data is outputted form the centralized monitoring system 111 or not.

S1004 and S1005 can be described in more detail: A schedule setting is requested to the centralized monitoring system 111 in S1004 in getConfiguration method. In step S1005, as a response from the centralized monitoring system 111, information on schedule setting is set in a newly set device.

An image forming device of the embodiment has a function of restraining transfer to a power save mode or power OFF when the centralized monitoring system 111 is accessed (requested) by HTTP/SOAP in a predetermined time period (for example, in ten minutes). The function can prevent a trouble in that the device cannot inform HTTP/SOAP due to transfer to a power save mode or power OFF.

Next, in S1006, a communication test is executed between the newly set device and the centralized monitoring system 111. Specifically, the device identifier is informed from the device to the centralized monitoring system 111 again in S1006. In step S1007, the centralized monitoring system 111 checks (compares) whether the received device identifier is in master registration information (the master registration information will be described later) or not. In step S1008, a communication test result is returned from the centralized monitoring system 111 to the device. Although steps S1006 to S1008 are described as different from steps S1004 to S1005, steps S1006 to S1008 can be included in steps S1004 to S1005.

Steps S1006, S1007 and S1008 will be described in further detail. In the communicationTest method, a communication test is executed. In step S1006, the product name of a device (an image forming apparatus or a local monitoring apparatus), a total indicating the number of recording sides without regard for the size of a sheet of recording paper, a total indicating the number of recording side for each size of a sheet of recording paper, a color total indicating the number of color recording side without regard for the size of a sheet of recording paper, and a color total indicating the number of recording side for each size of a sheet of recording paper are sent. If an error is indicated when the counter is obtained, −1 is set for the counter that cannot be obtained. When the centralized monitoring system 111 can save the data, it returns "data reception OK" at S1008. The "data reception OK" may be a character string indicating "OK" or a merely response. The communication test mentioned above is merely an example. First, the communication test only needs to check whether a communication between the device and the centralized monitoring system 111 is available or not. Second, the communication test only needs to check whether the centralized monitoring system 111 can obtain information on respective items such as various counters from the device or not. As an example of information on each item, "a counter" is exemplified in the description above.

When the device that received the communication test result determines that a communication with the centralized monitoring system 111 is correctly done, the operation proceeds to S1009 and automatically starts a maintenance service. Replies in S1005 or S1008 may have an implication to cause the device that informs the identifier, to inform the centralized monitoring system 111 of maintenance information.

On the other hand, in S1010, the host 102 or the host 107 (hereinafter described by using the host 102) makes a login request to the centralized monitoring system 111. If the login is authenticated, various types of information including user information and a device identifier are inputted on a setting screen. In step S1011, these types of information are registered in the database 112 of the centralized monitoring system 111 as master registration information. The processing in S1007 is executed based on various types of information (master registration information) registered in the database 112 of the centralized monitoring system 111 S1011 and a device identifier informed from the device to the centralized monitoring system 111 in S1006.

In step S1012, if the centralized monitoring system 111 determines that the device identifier communicated in S1006 has been registered in the master registration information based on the result of comparison in S1007, it informs the host 102 that comparison has been correctly done. The host after receiving the information outputs something indicating that the comparison has been correctly done on the display unit such as by displaying a green mark on the setting screen for an operator to view. The contents communicated to the host 102 can be checked from any device if only the device is a PC that is authorized to log in (the processing in S1010 of FIG. 10) the centralized monitoring system 111 via the Internet. That is to say, a service person at the location to set the device can check the comparison by viewing the WEB page provided by the centralized monitoring system 111 on a PC.

Next, the processing of the centralized monitoring system 111 in the sequence of FIG. 10 will be described in detail by using the flowchart of FIG. 11.

First in step S1101, the centralized monitoring system 111 receives a service participating request outputted from the device. The service participating request received here corresponds to S1004 or S1006 of FIG. 10. Next, in step S1102, the centralized monitoring system 111 generates schedule setting data to be returned to the device in response to reception of the service participating request. Here, this includes a timing determination processing for determining an informing timing included in the schedule setting data by using a random function or so as not to be the same as a previously generated informing timing.

Then, in S1103, the centralized monitoring system 111 sends a reply of the generated schedule setting data to the device. The device sends the device identifier again according to the schedule setting data.

In step S1104, the centralized monitoring system 111 determines whether the device identifier informed again from the device has been included in the master registration information (S1007 of FIG. 10). If it is determined "YES" in step S1104, the centralized monitoring system 111 determines whether a device corresponding to the device identifier that is determined to have been registered in the master registration information has been participated in the service or not in step S1105. If it is determined "YES" in step S1105, the centralized monitoring system 111 informs the device that the device has been participated in the service (step S1106). If it is determined "NO" in step S1105, the centralized monitoring system 111 proceeds to step S1107, where a maintenance service for the device corresponding to the device identifier received in step S1101 duly starts. The phrase "duly starts" means that no discarding processing as shown in step S2405 of FIG. 24 (later mentioned) is done.

If it is determined "NO" in step S1104, the centralized monitoring system 111 proceeds to step S1108, where it searches for the device identifier again to check whether the device identifier is registered in the registration information or not. The device identifier to be searched for corresponds to the device identifier received in step S1101. It is a matter of course that if reception of the device identifier in step S1101 is done from different devices for a plurality of times, searching processing of the master registration information based on step S1108 is done for each device identifier. The centralized monitoring system 111 may omit the processing in S1108 by performing, in S1101, the processing of second time examining of whether the device identifier received in step S1101 exists in the master registration information.

In step S1109, the centralized monitoring system 111 determines whether the device identifier to be searched for is registered in the master registration information thereafter or not. If it is determined "YES", the process proceeds to step S1107. If it is determined "NO", the centralized monitoring system 111 determines whether the device identifier is left without being registered in the master for more than a predetermined time period or not. Any time period such as a week, several tens of hours, or several months can be set to the predetermined time period. As the starting time of the predetermined time period, the time when the device identifier received in step S1101 is received or some sort of time relating to the device identifier can be utilized. Also, if only it is a time according to the device identifier.

If it is determined "NO" in step S1110, the centralized monitoring system 111 transfers operation to step S1108 again and repeats comparing processing mentioned above again. If it is determined "YES" in step S1110, the centralized monitoring system 111 executes warning processing in step S1111. For example, if warning mail is sent to a particular mail address that is previously registered in the centralized monitoring system 111, or if a terminal device of the host 102 accesses the centralized monitoring system by a Web browser, the warning processing is executed. In the warning processing, a warning message is sent by a markup language to the terminal device.

Figure 11:
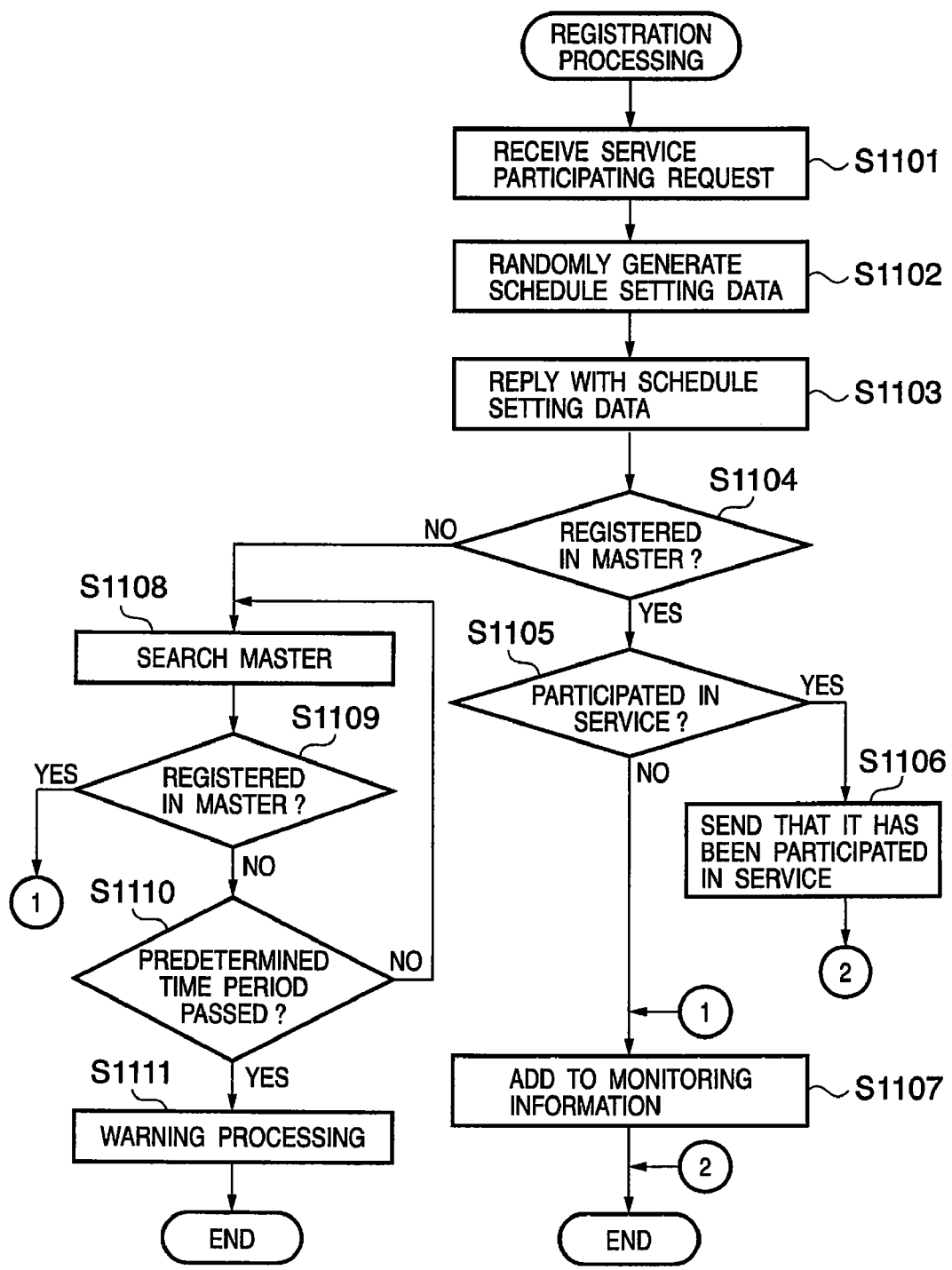
FIG. 11 is a flowchart showing the processing of the centralized monitoring system 111 in the sequence of FIG. 10.

As such, after it is determined that the device identifier is not registered in the database ("NO" in step S1104) according to the processing of the flowchart of FIG. 11, the centralized monitoring system 111 can determine again whether registration information corresponding to the device identifier is registered in the database or not (step S1109). For that purpose, the centralized monitoring system 111 can flexibly match the informed device identifier and the master registration information. The centralized monitoring system 111 can correctly detect the fact that registration of the device identifier into the database has not been checked for more than a predetermined time period, even if it has a history of receiving a service participating request (at least including the device identifier).

FIG. 12 is a diagram showing a display example of a setting screen (web browser) corresponding to the processing of S1011 of FIG. 10. That is to say, FIG. 12 is a diagram showing an example of a setting screen for an operator to input various types of information on a device and to register the device in the master registration information of the centralized monitoring system 111.

Although the setting screen is described as being displayed on the display unit of the host 102 in FIG. 10, it is not limited to that. The setting screen can be displayed on a display unit of a device if only the device has an information processing function for making a login request in S1010, such as a display unit of any of the various information processing devices including a personal computer (PC) carried by a service person as mentioned above or a PC109, a PC102 or the like.

In FIG. 12, the reference numeral 1201 denotes input fields for an operator to input a device identifier, a device name or the like. Information inputted in the input fields 1201 corresponds to the device identifier mentioned above. The reference numeral 1202 denotes a field for an operator to select whether an image forming apparatus communicates with the centralized monitoring system 111 via a local monitoring apparatus or directly without through a local monitoring apparatus. In FIG. 12, an image forming apparatus that communicates with the centralized monitoring system 111 without through a local monitoring apparatus is referred to as Embedded, meaning that a function of a local monitoring apparatus is embedded. The reference numeral 1203 denotes fields for an operator to input information on a customer such as customer name, a location to set the image forming apparatus. The device identifier of the input field 1201 may be any information if only the centralized monitoring system 111 can uniquely identify the device with the information. A device identifier may be a serial number that is recorded in each device so as to be different among all the devices when the device is manufactured, or may be a MAC address of the device. Input field 1204 is for an operator to input information indicating status (active versus inactive). The input field 1205 is for an operator to input information (monitoring apparatus ID) for identifying a local monitoring apparatus to monitor an image forming apparatus at a user's site.

Figure 13:
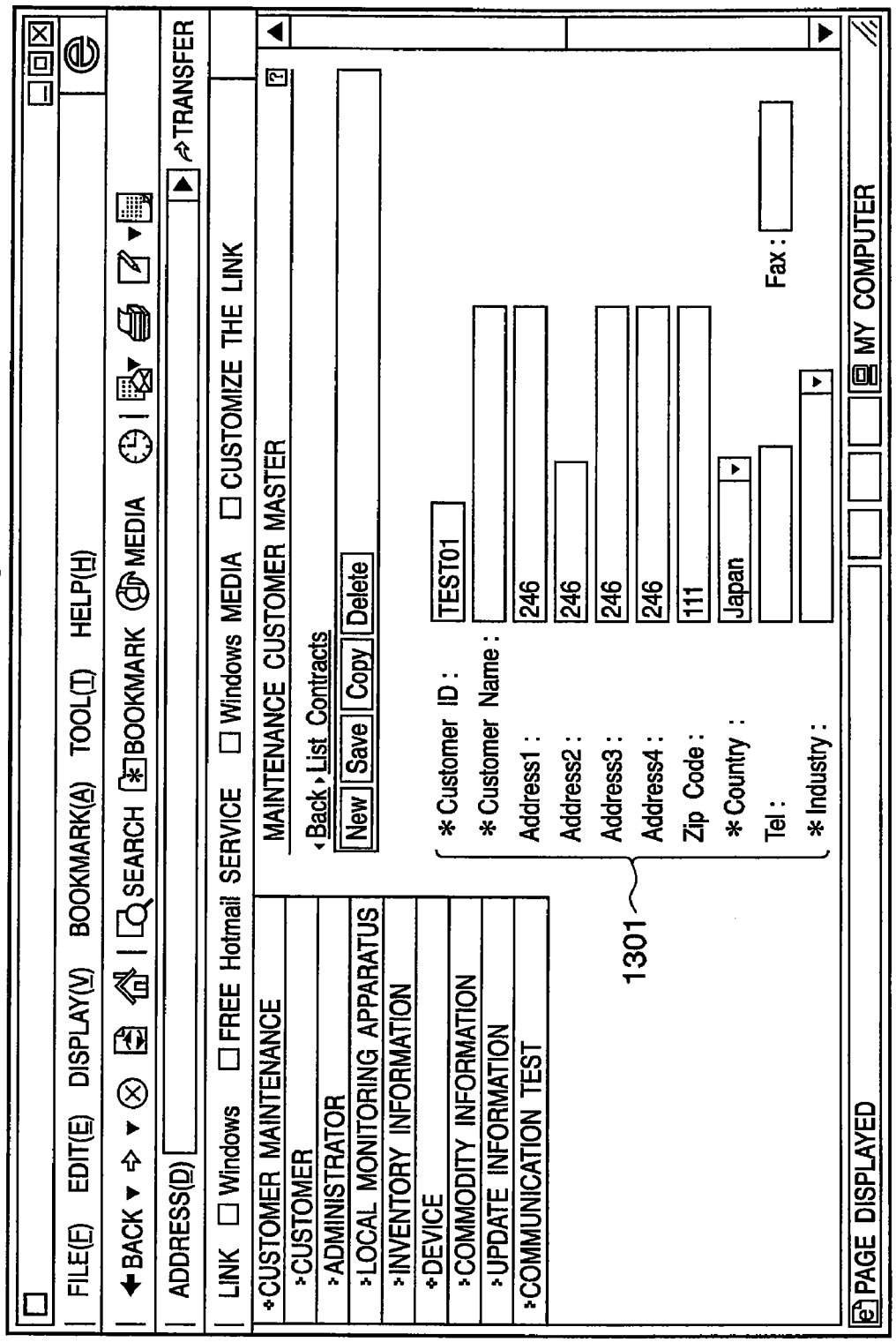
FIG. 13 is a diagram showing a display example of a setting screen (web browser) corresponding to the processing at S1011 of FIG. 10.

FIG. 13 is for an operator to input various types of information on a customer who owns the device. The reference numeral 1301 denotes fields for an operator to input a customer's customer ID, customer name, street address of a customer, zip code, country, telephone number, facsimile number, and customer's occupation.

Information inputted in the setting screen (web browser) of FIGS. 12 and 13 mentioned above is registered in the database 112 of the centralized monitoring system 111 as a piece of master registration information as mentioned in S1011 of FIG. 10. Then, comparing processing based on the registered information is executed in S1007 of FIG. 10.

Figure 14A:
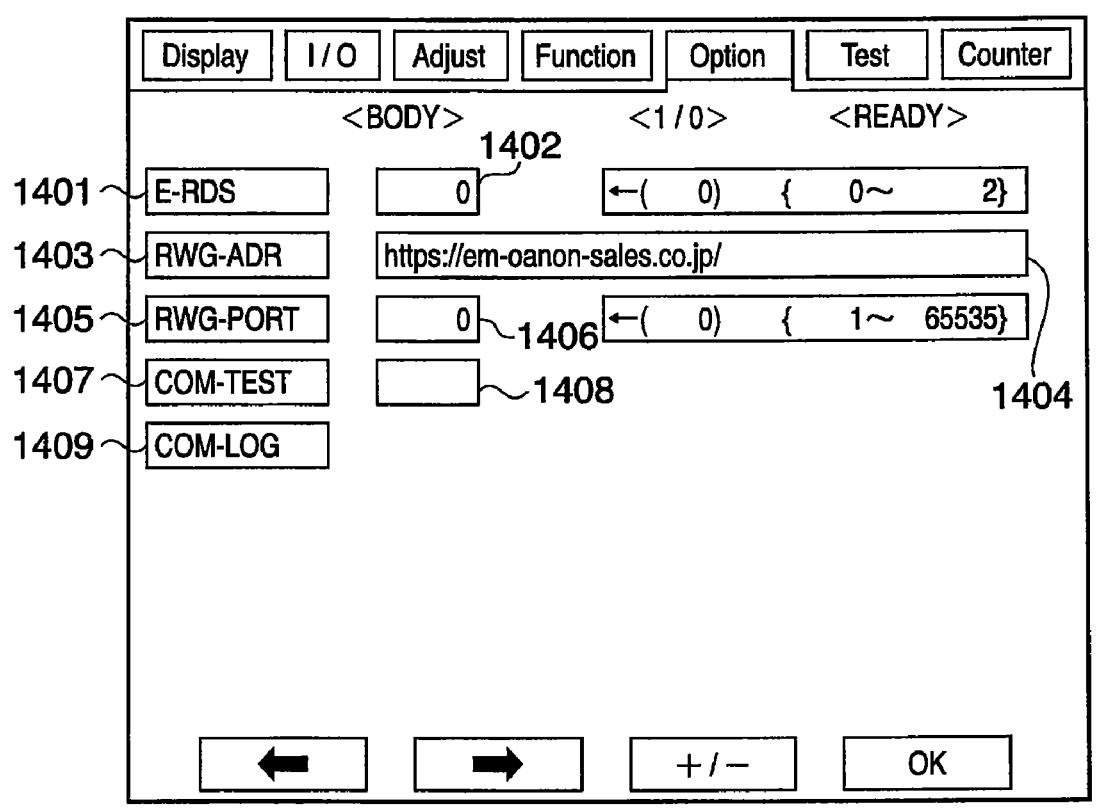
FIG. 14A is a diagram showing an operation screen for an operator to execute various settings corresponding to S1101 of the FIG. 10 or to make an indication to execute various kinds of operation, such as to executing a communication test, corresponding to S1006.

FIG. 14A shows an example of an operation screen in the set device for an operator to do various settings in S1001 or various operation executing instructions such as a communication test at S1006 of FIG. 10.

The input field 1402 is for an operator to set whether or not to start the maintenance service (set whether or not to activate the service mode). If an operator inputs "1" in the input field 1402, the device enters the service mode and executes operation for sending counter information such as a print output counter or a scanner counter for each size of a sheet of paper, various types of error information, and various types of resource information to the centralized monitoring system 111 thereafter. If an operator inputs "0" in the input field 1402, the device restricts sending of the various counters or various types of resource information to the centralized monitoring system 111.

The input field 1404 is for an operator to input a URL of the centralized monitoring system. In this embodiment, a destination of communication of a communication test is based on the URL. It is a matter of course that the destination may be an IP address or the like instead of a URL. The input field 1406 is for an operator to input a communication port number with the centralized monitoring system 111 (PGW-PORT (1405)). For the communication port number, any value of 1-65535 may be set. A predetermined port number may be a default.

The reference numeral 1407 denotes an operating unit for an operator to order a communication test described from S1004 to S1008 in FIG. 10. When an operator selects the part of 1407 and presses the "OK" button in FIG. 14A, a communication test between the device and the centralized monitoring system 111 is tried (for example, for each hundreds of milliseconds). Reference numerals 1401 and 1403 denote fields that can be used to enter other information.

Figure 14B:
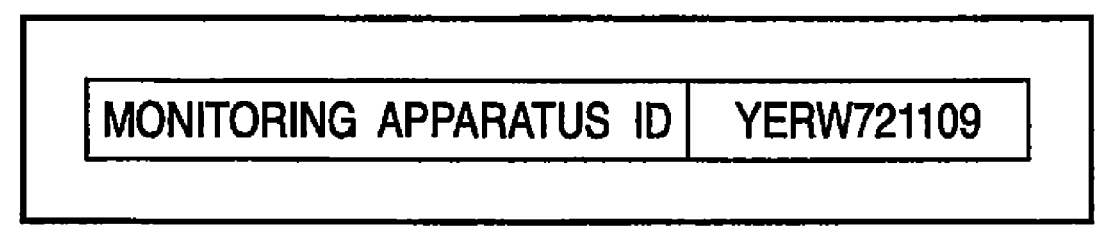

FIG. 14B shows an example of the contents informed from the device to the centralized monitoring system when the communication test is ordered. The informed contents of FIG. 14B can be the same as the contents informed at S1004 and S1006 of FIG. 10. The result of the communication test (S1008) is displayed on the result informing field 1408 by "OK" or "NG". If a destination of the communication to be updated (URL) is present as a reply to the communication test, the destination of the communication to be updated (URL) may be received from the centralized monitoring system 111, leaving the destination of the communication set in the input field 1404 to be updated later.

The reference numeral 1409 denotes the ordering part for displaying a communication history in the communication test above. An operator instructs the part 1409 so that a communication history is displayed.

Although not shown in FIG. 14A, proxy setting in a network environment to set the device can be done via another screen (not shown; for example, a user mode screen).

FIG. 15A is a diagram showing an example of registering of the master registration information to be registered in the database 112 of the centralized monitoring system 111. The master registration information is generated based on input processing in S1011 of FIG. 10.

A monitoring apparatus ID 1501 shows information (a sample of which is shown as 1508) for identifying a local monitoring apparatus that monitors an image forming apparatus at a user's site, corresponding to information inputted in the input field 1205 of FIG. 12. The device identifier 1502 is for identifying an image forming apparatus. For example, in the fields denoted by 1509, three image forming apparatuses monitored by the local monitoring apparatus whose monitoring apparatus ID is ABCD123456 are registered.

The reference numerals 1503, 1504 and 1505 denote the monitoring apparatus ID, sales company information corresponding to each of the device identifiers, customer ID and IP address, respectively. In the field of monitoring schedule 1506, schedule setting data described at S1005 of FIG. 10 is shown. The field denoted by 1507 shows various types of information in more detail.

FIG. 15B shows a case where a new device is added to the case shown in FIG. 15A and registered in a master registration information. In FIG. 15B, fields denoted by 1510 and 1511 are added.

For example, if the informed contents shown in FIG. 14B is informed from the newly set device to the centralized monitoring system on the assumption that the master registration information shown in FIG. 15A is present, it is determined "NO" in step S1104 of FIG. 11. Then, the processing of steps S1108 to S1110 is repeated until registration is done. When the master registration information becomes that shown in FIG. 15B, it is determined "YES" in step S1109, and the maintenance service duly starts in step S1107.

In the field denoted by 1511 of FIG. 15B, the monitoring apparatus ID and the device identifier are the same. That means that the image forming device communicates with the centralized monitoring system 111 without going through a local monitoring apparatus.

As mentioned above, according to the first embodiment, setting of the maintenance service can be done more correctly than in the conventional arts without synchronizing an additional setting at a device side and setting according to the device at a service center side.

Second Embodiment

In the second embodiment, when the device is set, whether a communication is through a local monitoring apparatus to participate in a maintenance service or not, and, if so, which local monitoring apparatus will be passed through, can be automatically set appropriately.

FIG. 16 shows an outline of a sequence over the entire system according to the second embodiment, when a new device is set at a customer side.

First, in step S1601, a device is purchased. In S1602, setting with respect to a device including at least a device identifier is registered in the database 112 of the centralized monitoring system 111. The registration is executed in the same manner as that in the processing in S1011 of the first embodiment. The processing in S1602 is not necessarily executed after a customer has purchased the device in S1601 and before the device is shipped in S1603. The processing may be executed at any time.

In S1604, various types of settings for a device that are the same as the setting in step S1002 of FIG. 10 are done (for example, setting a device as a network supporting device such as a proxy). In S1605, actual setting of the device is executed. In S1606, the same processing as in steps S1004 to S1008 of FIG. 10 is executed. As a result, the device gives information including the device identifier to the centralized monitoring system 111. An example of the information is shown in FIG. 17B. FIG. 17B further includes a local monitoring apparatus list. It is a matter of course that if a local monitoring apparatus is not present, the list is not included.

In S1607, the centralized monitoring system 111 checks whether the device identifier included in the information sent in step S1606 is in the master registration information or not. In S1608, the centralized monitoring system 111 checks whether the local monitoring apparatus included in the informed contents has been included in the master registration information or not. In FIG. 17B, local monitoring apparatuses are shown by IP addresses in the list. That is to say, when an operator refers to the master registration information, the operator can identify the customer from the device identifier 1702 and can check whether the local monitoring apparatus on the local monitoring apparatus list is included in the local monitoring apparatuses associated with the identified customer or not.

In S1609, the centralized monitoring system 111 determines whether it monitors the device that informed the device identifier via a local monitoring apparatus or directly without through a local monitoring apparatus. For example, if a local monitoring apparatus in the same subnet is included in the master registration information based on the IP address, the centralized monitoring system 111 determines to monitor the target device (for example, an image forming apparatus identified by the device identifier) via the local monitoring apparatus.

The determination above will be described by using an example in which the master registration information as shown in FIG. 15B is stored in the database 112 and the monitor registration request 1701 for the contents as shown in FIG. 17B is received in S1606. It is assumed that the monitoring apparatus ID to which registration information of 1510 belongs is not determined at least at a user side system at this time. It is also assumed in the description below that the image forming apparatus 124 is set in the system 119 in office Y of company A in FIG. 1.

It is apparent based on the informed contents exemplified in FIG. 17B, that the device (image forming apparatus) 124 (device ID=DDDD873508) that made a monitor registration request is sold to a customer whose customer ID=000000001, from information 1501 of FIG. 15B. From the information of FIG. 17B, it is apparent that the device can communicate with the local monitoring apparatus 122 having address IP=123.55.25.99 and the local monitoring apparatus 123 that is at address IP=123.55.25.100. From the master registration information (FIGS. 15A and 15B), it is apparent that IP=123.55.25.99 is a device whose device ID=ABCD12456 and IP=13.55.25.100 is a device whose device ID=DDDD873567.

From FIG. 15B, it is apparent that the local monitoring apparatus whose device ID=ABCD123456 monitors three devices, while the local monitoring apparatus whose IP=123.55.25.100 monitors two devices.

In S1609, the centralized monitoring system 111 determines which local monitoring apparatus to use, and specifically causes the local monitoring apparatus that is currently monitoring a smaller number of devices, i.e., the local monitoring apparatus 123 whose device ID=DDDD873567

(IP=123.55.25.100), to monitor the device 124, in order to distribute load among the local monitoring apparatuses, based on the analysis result above.

If the device (image forming apparatus) 131 of FIG. 1 makes a monitor registration request, the centralized monitoring system 111 determines that it directly monitors the device without communication through a local monitoring apparatus in S1609 (as a result, registration information shown by 1511 is generated), as the number of local monitoring apparatus is 0 in step S1605.

In S1610, according to the check results obtained in steps S1607 and S1608, the centralized monitoring system 111 sends a reply of "can be registered" (it is in the master registration information of FIG. 15B) or "cannot be registered" (it is not in the master registration information) to the device. The device receives the reply from the centralized monitoring system 111 in S1611.

In S1612, the device informs the centralized monitoring system 111 of device basic information including the IP address, the model name and the device name given by a user. In S1613, the centralized monitoring system 111 updates the master registration information based on the informed contents sent in S1612. Although FIGS. 15A, B do not show information such as the device name because information is restricted to that necessary to describe the present invention in the figures, other types of information such as the device name can be included.

In S1614, the centralized monitoring system 111 sends an indication that the master registration information has been updated in step S1613 and an instruction to the device what to do next to the device (receipt of which is step S1615). The instruction here is an instruction to the monitoring center host 102 to start sending a counter and status (or, to prepare for a counter and status request from the monitoring center host 102), if the centralized monitoring system 111 determines that it will not pass through a local monitoring apparatus as in the case of the device 131 shown in FIG. 1. If the centralized monitoring system 111 determines to utilize the local monitoring apparatus 117 as in the case of the device 124 shown in FIG. 1, it is the instruction to wait for an instruction from the local monitoring apparatus 117.

As another example of the procedure above, the following procedure can be used. For example, in S1605, the device may be adapted to send device base information that is ordinarily sent in S1612 and send confirmation of registration in S1610 and completion of registration/operation instruction in S1614 collectively as a result of confirmation and determination processing in steps S1607 to S1609.

Next, a sequence after sending the completion of registration/operation instruction in S1614 will be described for the case in which the local centralized monitoring system is not utilized as in the device 131 of FIG. 1 and for the case in which the local centralized monitoring system is utilized as in the device 124 of FIG. 1.

If the local monitoring apparatus is not utilized as in the device 131 of FIG. 1, the device starts sending the counter and the status to the centralized monitoring system 111 in S1616. Alternatively, the device enters a state in which it can receive a counter and status request from the centralized monitoring system 111.

If the local monitoring apparatus (123) is utilized as in the device 124 of FIG. 1, the device waits for information that the registration has been completed from the local monitoring apparatus determined in S1609 by the centralized monitoring system 111 in S1617. In S1618, the centralized monitoring system 111 sends a device monitoring request including various types of settings (base information) of the device registered in S11613 to the local monitoring apparatus determined in S1609. The local monitoring apparatus received the device monitoring request in S1618 registers various types of settings of the device to the monitoring device information table 1911 (FIG. 19B) at S1619.

FIG. 19B is a diagram showing an example of data arrangement of a monitoring device information table 1911 saved in the local monitoring apparatus (123). As the local monitoring apparatus monitors two devices indicated by records 1912 and 1913, the record 1914 is added as information on the device 124 in response to monitor registration information in S1619.

Next, in S1620, the local monitoring apparatus informs the newly added monitored device of the completion of the registration. The local monitoring apparatus remotely sets the device so as to request the counter and status from the local monitoring apparatus and to inform the local monitoring apparatus of the counter and status thereafter. The device receives the information from the local monitoring apparatus (S1620) and sets itself according to the information in S1621.

In S1622, whether it passes through the local monitoring apparatus or not, the device that received information of "cannot be registered" from the monitoring center host from S1610 waits for the completion of registration in S1614. As indicated at S1623, one week after registration has been completed, a written notification to that effect is send by mail to the responsible person at the sales company.

Next, the processing at a device corresponding to FIG. 16 will be described using the flowchart of FIG. 17A.

First, the device receives input from a service person or a user on a setting screen shown in FIG. 14A. In step S1701, the device determines the input in the input field 1402 of FIG. 14A. That is to say, if "1" is set in the input field 1402, the device determines "YES" in step S1701, and if "0" is set in the input field 1402, the device determines "NO" in step S1701.

If the device determines "NO" in step S1701, the device outputs a request for deleting registration including the device identifier to the centralized monitoring system 111 in step S1712, confirms that the outputted request for deleting registration is received at the output destination and finishes the processing. Although methods of requesting for deleting registration are omitted in the flowchart, the methods are three as below.

(1) The device sets only the centralized monitoring system 111 as the output destination of a request for deleting registration. The centralized monitoring system 111 deletes the device identified by the device identifier from the master registration information. If the centralized monitoring system 111 monitors the device through a local monitoring apparatus, it sends a request for deleting registration (including the device identifying information) to the local monitoring apparatus that monitors the device. Then, the centralized monitoring system 111 deletes the device from a monitoring device information table of the local monitoring apparatus.

(2) If the centralized monitoring system 111 monitors the device through a local monitoring apparatus, the device sets only the local monitoring apparatus as the destination of sending the request for deleting registration, and deletes the device from the monitoring apparatus information table of the local monitoring apparatus. Then, the local monitoring apparatus sends a request for deleting registration to the centralized monitoring system 111 and deletes the device from the master registration information of the centralized monitoring system 111.

(3) Both of the centralized monitoring system 111 and the local monitoring apparatus that monitors the device are set as the destinations of sending the request for deleting registration. The request for deleting registration is sent to the local monitoring apparatus only when the device is monitored via the local monitoring apparatus. The device is deleted from the master registration information of the centralized monitoring system 111 and the monitoring device information table of the local monitoring apparatus.

If the device determines "YES" in step S1701, it creates the monitor registration request 1701 shown in FIG. 17B (step S1702), and communicates the destination of information (the centralized monitoring system 111) previously saved in the device. As mentioned above, an example of information in FIG. 17B corresponds to the contents to be generated when a new device 124 is added at office Y of company A, 119 in FIG. 1. In the case of the system 129 of company B in FIG. 1, no local monitoring apparatus is found and the monitor registration request 1701 shows the information indicating the number of the local monitoring apparatus is 0 (a local monitoring apparatus list is not present).

In step S1703, the device checks the contents of the registration confirmation from the centralized monitoring system 111. If the device determines "registration NG" in step S1703, it waits until it is determined "registration OK" in step S1711. If the device determines that it has been registered to be monitored in step S1703, it finishes the processing as it has started to send information to the centralized monitoring system 111 or the local monitoring apparatus.

If the device determines "registration OK" in step S1703, it sends the product name for identifying the model, the device name given by a user and the like to the centralized monitoring system 111 as device base information in step S1704 (the information is illustrated at 1704 in FIG. 17B). Then, in step S1705, the device waits for notification of the completion of the registration. The device can be adapted to have a timeout for it to determine "registration failed" appropriate for it since the device will keep waiting until the completion of the registration is notified. If the device can receive the notification of the completion of the registration in step S1705, it confirms an instruction included in the notification of the completion of the registration in step S1706.

If the device is instructed to directly send the monitoring information to the centralized monitoring system 111 in step S1706, it starts sending the counter or status information or the like to the centralized monitoring system 111 in step S1707. If the device is instructed to utilize a local monitoring apparatus in step S1706, it waits for the notification of the completion of the registration from the local monitoring apparatus instructed in step S1708. When the device receives the notification of the completion of the registration from the instructed local monitoring apparatus at the step S1709, it proceeds to the step S1710. At the step S1710, the device starts sending the counter or status information or the like to the local monitoring apparatus instructed at the step S1706.

Figure 18:
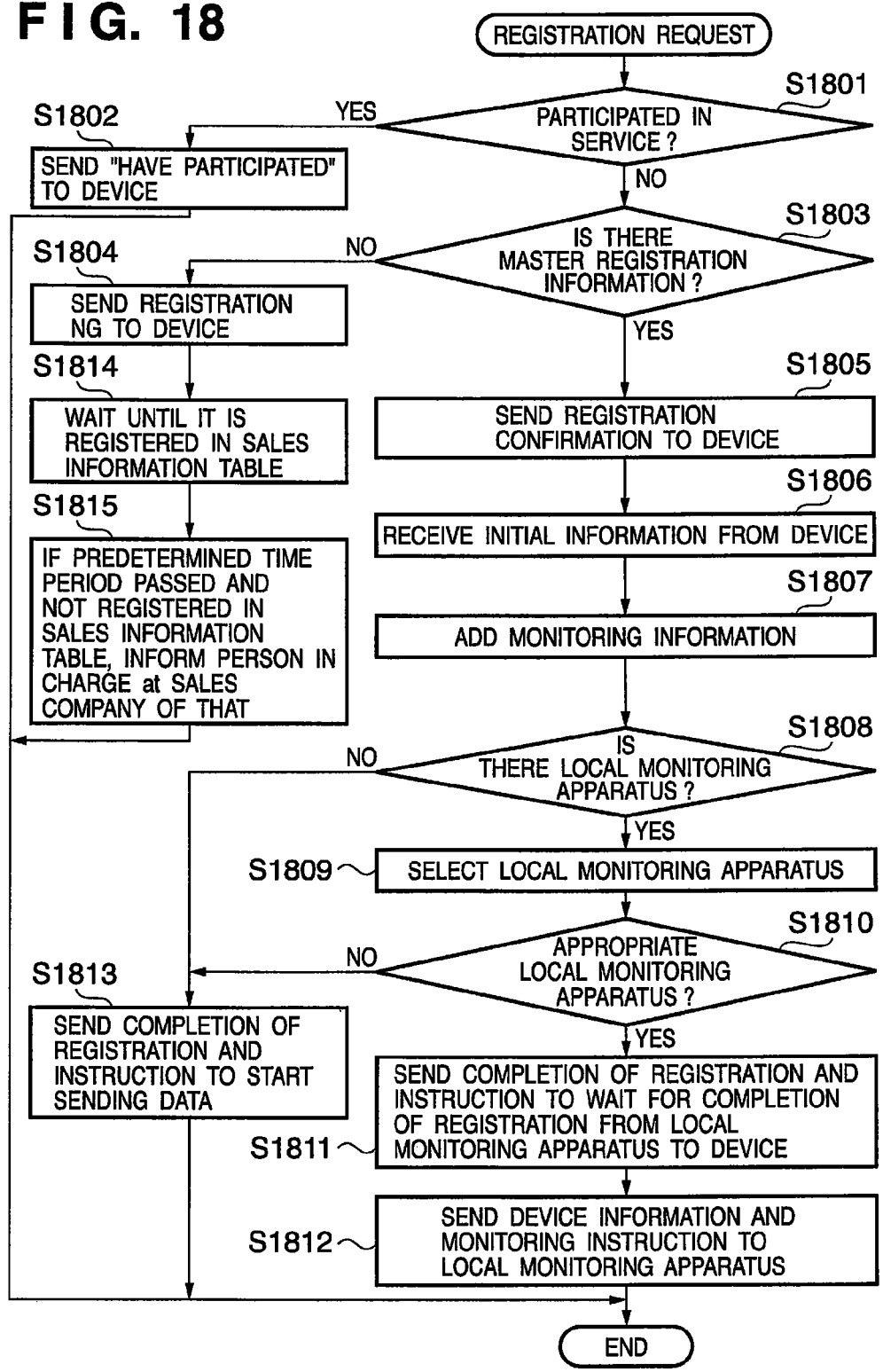
FIG. 18 is a flowchart for illustrating the processing at the centralized monitoring system corresponding to the sequence of FIG. 16.

Next, the processing at the centralized monitoring system corresponding to that shown in FIG. 16 will be described with reference to FIG. 18.

In step S1801, the centralized monitoring system 111 determines whether the device that made a monitor registration request has been monitored or not by referring to the device identifier and the master registration information included in the monitor registration request. If centralized monitoring system 111 determines that the device has been monitored (has participated in the service), it sends notification indicating that the device has been participated in the maintenance service to the device that made the monitor registration request in step S1802 and finishes the processing.

If it is determined that the device that made the monitor registration request has not been participated in the service in step S1801, the centralized monitoring system 111 determines whether the device is registered in the master registration information in step S1803. If the device is not registered in the master registration information, the centralized monitoring system 111 determines that the device has not been registered or has been wrongly registered. Then, the centralized monitoring system 111 informs the device that made a monitor registration request of "registration NG to the centralized monitoring system" in step S1804, and keeps waiting (step S1814). If a predetermined time period (for example, a week) has passed, as determined in step S1814, then the centralized monitoring system 111 informs a person in charge at the sales company of warning in step S1815. The master registration information is periodically referenced in step S1814. If it is determined that the device is registered in the master registration information, the centralized monitoring system 111 transfers its operation to step S1805.

If the centralized monitoring system 111 can confirm that the device that made a registration request is registered in the master registration information in step S1803, operation proceeds to step S1805. In step S1805, the centralized monitoring system 111 informs the device that made a registration request of "registration OK". In step S1806, the centralized monitoring system 111 receives device base information (initial information) sent from the device in response to the notification and updates the master registration information in step S1807. Although the product name or the device name received in step S1806 is not described in FIGS. 15A and 15B, information including the product name or the device name is also registered in the master information for each device in reality.

In step S1808, the centralized monitoring system 111 determines whether the IP address list of the local monitoring apparatus is included in the monitor registration request 1701 as shown in FIG. 17B or not. If it is determined that no local monitoring apparatus is present in step S1808, operation proceeds to step S1813. In step S1813, the centralized monitoring system 111 sends the completion of the registration and an instruction to directly send the counter or the status information to the centralized monitoring system (or to prepare for an information request from the centralized monitoring system), to the device that made the monitor registration request.

If it is determined that a local monitoring apparatus is present in step S1808, operation proceeds to step S1809. In step S1809, the centralized monitoring system 111 refers to the master registration information and determines the local monitoring apparatus to be used. The centralized monitoring system 111 may be adapted to set the upper limit to the number of devices for each local centralized monitoring system to monitor, and determine that no local centralized monitoring system to monitor a device is present, if all the local centralized monitoring systems have already been monitoring the upper limit number of image forming apparatuses. If the centralized monitoring system 111 determines that no local monitoring apparatus to monitor a device is in a plurality of local monitoring apparatuses in step S1810 based on the determination in step S1809, it will directly monitor the device and operation proceeds to step S1813.

If it is determined that a local monitoring apparatus to monitor a device is present in step S1810, operation proceeds to step S1811. In step S1811, the centralized monitoring system 111 informs the device that made a monitor registration request of the completion of the registration and also instructs the device to wait for the notification of the completion of the registration from the local monitoring apparatus selected in step S1809. Then, in step S1812, the centralized monitoring system 111 sends information on the image forming apparatus to register to be monitored and a registration request to the local monitoring apparatus determined in step S1809.

As described at S1012 of FIG. 10, a request for deleting registration of a device is also sent to the centralized monitoring system 111 from a device or a local monitoring apparatus. As the processing for the request for deleting the registration has been described in step S1712, it is omitted from description in the flowchart.

Figure 19A:
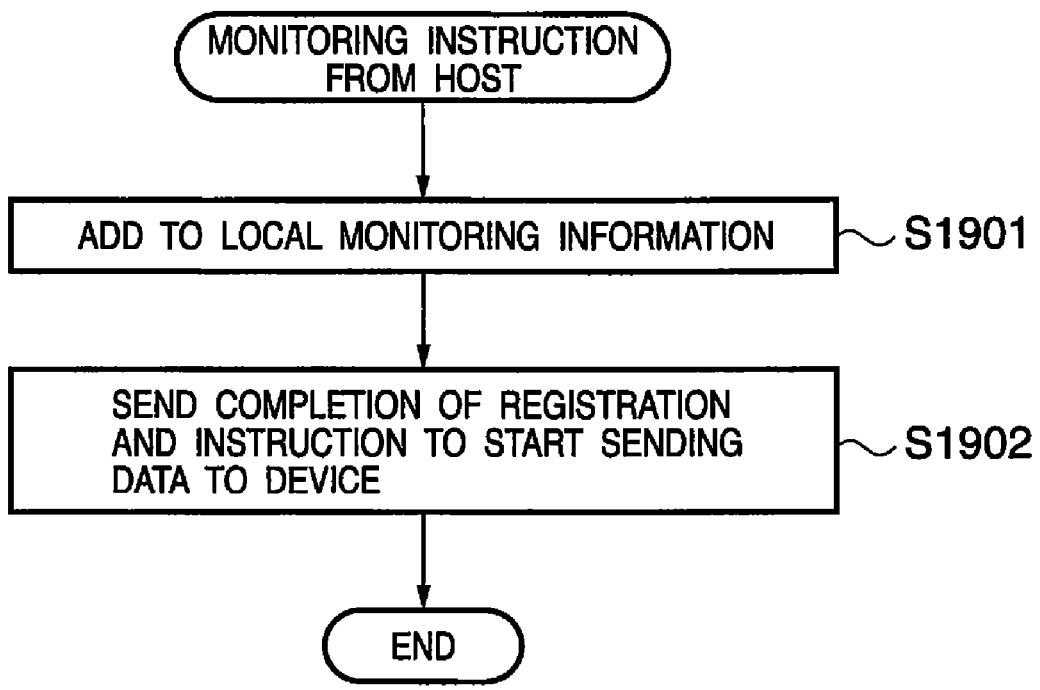
FIG. 19A is a flowchart of the processing by a local monitoring apparatus that starts in response to receiving a request for registering a device from a centralized monitoring system.

FIG. 19A is a flowchart of the processing by a local monitoring apparatus that starts in response to receiving a request for registering a device from a centralized monitoring system.

In step S1901, the local monitoring apparatus receives an instruction to monitor a device from the centralized monitoring system 111 and adds various types of settings for the device to be monitored in the device monitoring information table. In step S1902, the local monitoring apparatus sends the completion of the registration and an instruction to send the counter or the status information to the local monitoring apparatus (or to prepare for an information request from the local monitoring apparatus), to the newly monitored device.

Figure 17A:
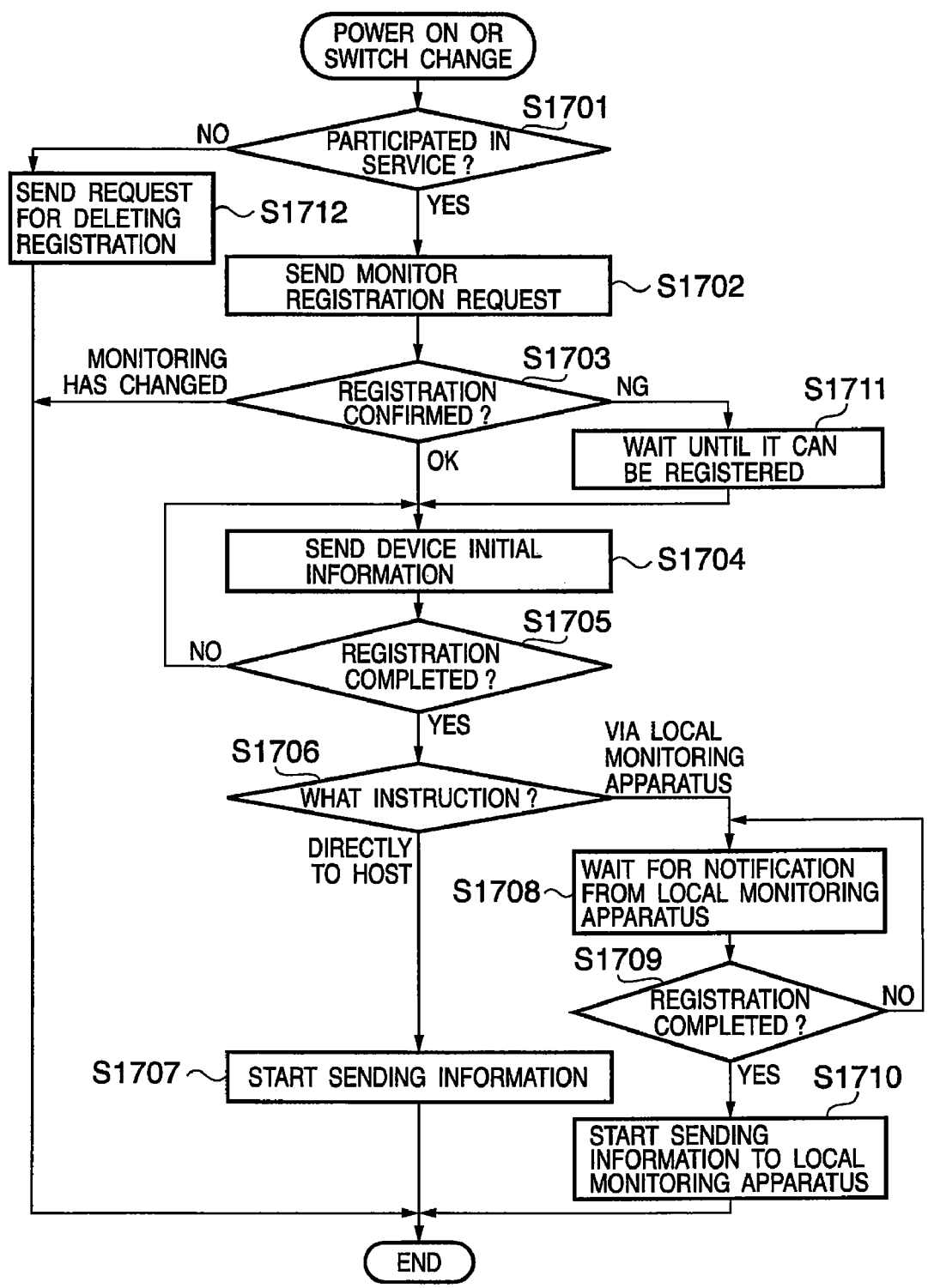
FIG. 17A is a flowchart for illustrating the processing at a device corresponding to FIG. 16.

As mentioned at S1712 of FIG. 17A, also a request for deleting registration of a device may be sent to the local monitoring apparatus from a device or the centralized monitoring system. FIG. 19B is a monitoring device information table 1911 stored in an HDD 304 or FlashROM 403 of each local monitoring apparatus. FIG. 19B is the device monitoring information table of the local monitoring apparatus 123 of office Y of company A, 119 shown in FIG. 1. FIG. 19B shows the situation where the centralized monitoring system adds a record of a device 124 (record 1914) in response to an instruction to monitor a device, while the local monitoring apparatus is monitoring an image forming apparatus 126 (record 1912) and an image forming apparatus 127 (record 1913).

Third Embodiment

In the third embodiment, updating of the master registration information described in the first and the second embodiment will be described in more detail. Therefore, the contents to be described in the third embodiment are applied to the first and the second embodiments.

Figure 20A:
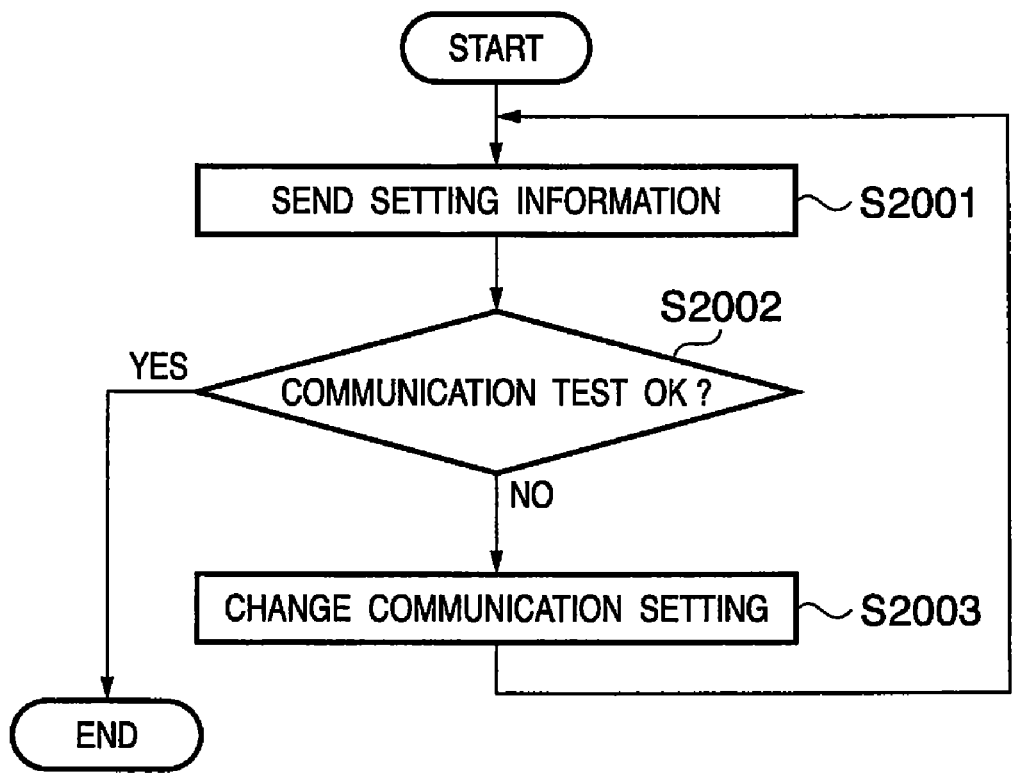
FIGS. 20A and 20B are flowcharts for illustrating the processing of the centralized monitoring system according to the third embodiment.

FIG. 20A is a flowchart for illustrating the processing of a setting device corresponding to the notification including a device identifier in steps S1004 and S1006 of FIG. 10, S101 of FIG. 11, and S1606 of FIG. 16 described above.

First, in step S2001 of FIG. 20A, the device sends setting information shown in FIG. 21 to the centralized monitoring system 111 in step S2001 of FIG. 20A. Various types of information such as the MAC address and the like are included in addition to the device identifier (the monitoring apparatus ID in the case of FIG. 21) in FIG. 21. However, the device may send information as shown in FIG. 21 also in steps S1004, S1006 of FIG. 10, S1101 of FIG. 11 and S1606 of FIG. 16.

In step S2002, as a result of a communication test, if the centralized monitoring system identifies the determination and the communication test is correctly done, the device finishes the processing, and determines that the set device can correctly communicate with the centralized monitoring system and finishes the setting operation. Whether the communication test is correctly done or not is displayed in the field denoted by 1408 of FIG. 14, for example.

If it is determined "NO" in step S2002, the process proceeds to step S2003.

In particular, if a communication test is done between a local monitoring apparatus and a centralized monitoring system, a service person or the like can access a WEB site provided by the centralized monitoring system by using a portable terminal and reference the communication test result 2113 by a WEB browser.

If the communication test result 2113 is not generated or the communication test result 2113 indicates a failure, there is a possibility that various types of communication settings including a proxy or the like for communication with the centralized monitoring system 111 have errors. Therefore, the device updates setting of the local monitoring apparatus in step S2003.

Figure 20B:
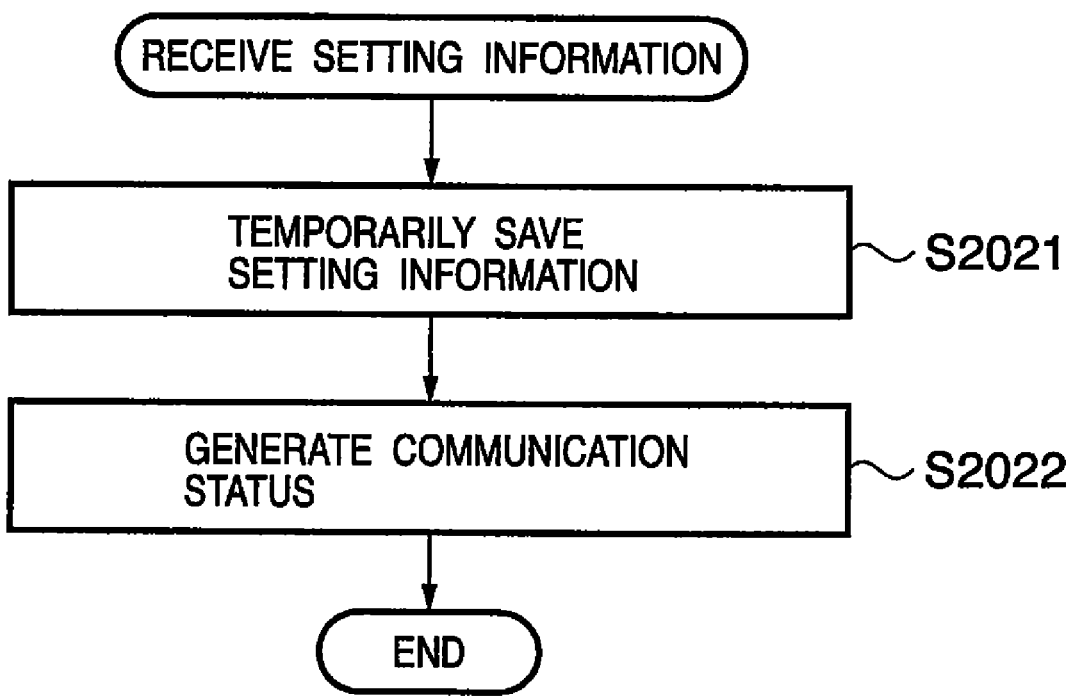

FIG. 20B is a flowchart for illustrating the processing at the centralized monitoring system 111 corresponding to FIG. 20A. In step S2021, the device temporarily saves informed setting information in the database (communication test log saving means). If a communication test is correctly done with the device at the destination of notification of the setting information, in step S2022, the device generates a communication test result 2113 as shown in <communication test result> of FIG. 21 and replies to the device.

FIG. 21 shows a detail of setting information sent to the centralized monitoring system in step S2001 of FIG. 20A. FIG. 21 shows the case where an informing device is the local monitoring apparatus. If the set device is a local monitoring apparatus, the setting information includes set monitoring apparatus information 2101 and a set device information list 2105. In order to indicate that the centralized monitoring system 111 received set information, it generates communication test result information 2113.

The set monitoring apparatus information 2101 includes a monitoring apparatus ID 2102 for uniquely identifying a monitoring apparatus, an IP address 2103 and a monitoring apparatus type 2104. The type 2104 indicates whether the device is a local monitoring apparatus (Type=1) or an image forming apparatus (Type=2). If whether the monitoring apparatus is the local monitoring apparatus or the image forming apparatus can be identified from the ID, the type 2104 is not needed.

The set device information list 2105 includes a monitoring apparatus ID 2106, a device identifier 2107 for uniquely identifying an image forming device, a MAC address 2108 that can uniquely identify an image forming apparatus device, an IP address 2109, the type of an image forming device 2110, a model name 2111, and an offset value 2112.

The communication test result 2113 includes the monitoring apparatus ID 2114 and the status 2115. For example, the communication test result 2113 of FIG. 21 shows that the centralized monitoring system correctly received setting information on the device whose the monitoring apparatus ID=AIJY3001.

Figure 22:
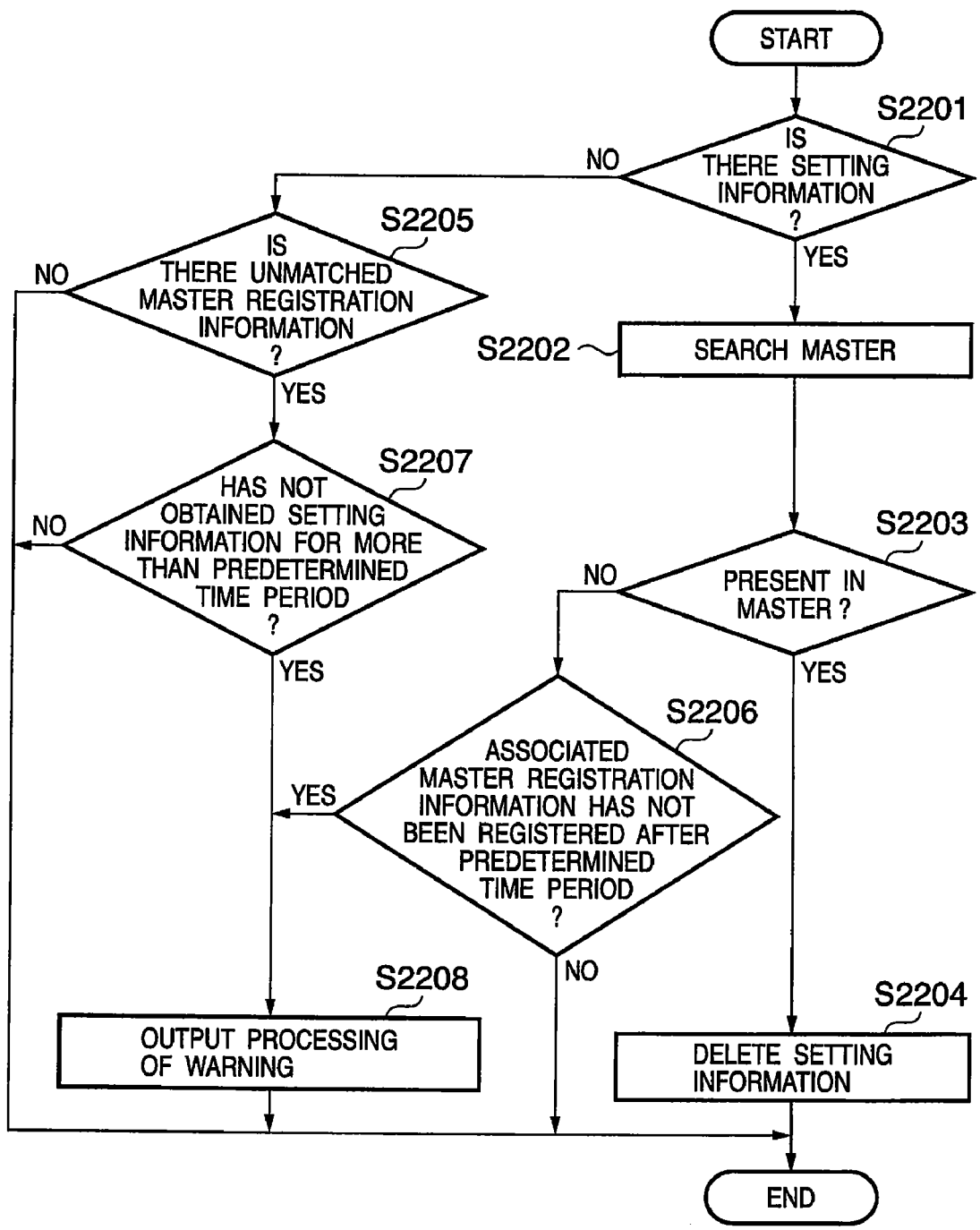
FIG. 22 is a flowchart showing the processing of the centralized monitoring system 111 after doing the processing at FIG. 20B.

Next, the processing will be described with reference to FIG. 22. The processing of steps S2201 to S2208 in FIG. 22 is periodically done a plurality of times.

First, in step S2201, the centralized monitoring system 111 determines whether setting information is in the database or not (communication test log saving means). If the centralized monitoring system 111 determines "YES" in step S2201, it sets a device identifier, for example, included in the confirmed setting information as a key and searches the master registration information for the device identifier in step S2202.

If it is determined "NO" in step S2203, the centralized monitoring system 111 determines whether the master registration information corresponding to the device identifier included in previously informed setting information is newly added and registered or not after a predetermined time period in step S2206. If it is determined that the corresponding master registration information is not registered even after the predetermined time period, the centralized monitoring system 111 executes warning outputting processing in step S2208. If it is determined "NO" in step S2206, the centralized monitoring system 111 finishes the processing.

If it is determined "YES" in step S2203, the centralized monitoring system 111 proceeds to step S2204 and deletes the setting information corresponding to the device identifier which is set as a key. With the deleting processing, the centralized monitoring system 111 can effectively use its memory. If the setting information is once communicated from the device, the centralized monitoring system 111 saves that setting information as a history so that it compares a device with the master registration information based on the saved history. Accordingly, the setting information needs not to be sent from the device again. That reduces processing load even at the device side.

If it is determined "NO" in step S2201, the centralized monitoring system 111 determines whether unmatched master registration information is present or not in step S2205. If it is determined NO in the determination, the centralized monitoring system 111 finishes the processing. If it is determined "YES", the centralized monitoring system 111 transfers operation to step S2207.

In step S2207, the centralized monitoring system 111 determines whether it has not obtained the setting information for more than a predetermined time period or not. Any time period such as a week, several tens of hours or several months can be set to a predetermined time period. The starting point of the predetermined time period may be a time when master registration information is newly registered at least including a new device identifier or a time according to a newly registered time of the master registration information. The term "setting information" here means notified information corresponding to steps S1004 to S1006, S1606, and S1612.

If the centralized monitoring system 111 determines "YES" in S2207, the processing proceeds to step S2208 and does the warning output processing. As detail on the warning output processing is the same as that described in step S1111 of FIG. 11, they are omitted from the description. If the centralized monitoring system 111 determines "NO" in step S2207, it finishes the processing.

As such, according to the processing of the flowchart of FIG. 22, the centralized monitoring system 111 can flexibly realize matching between the setting information informed from the device and the master registration information. In particular, with the processing of steps S2203 and S2204, even after the centralized monitoring system 111 has determined that the device identifier once informed from the device is not registered in the database (master registration information), it can detect the database registration after the determination and execute the processing of step S2404 of FIG. 24. The centralized monitoring system 111 periodically determines whether a history of the saved setting information and new master registration information are registered or not. If the centralized monitoring system 111 identifies that a history is registered as a result of the determination, it can determine whether the device identifier included in the history is registered in the master registration information of the database or not. If a device identifier cannot be obtained after a predetermined time period even after the master registration information is registered in the centralized monitoring system 111 before receiving the setting information, the centralized monitoring system 111 can execute the warning output processing. Accordingly, the centralized monitoring system 111 can quickly detect delay in the setting operation by a setting operator such as a service person. Even if the master registration information is registered to the database after reception of the setting information, the setting operator can finish the device setting operation and also appropriately evaluate validity of the prior setting information after the setting operation.

FIG. 23 is a diagram showing registration of master registration information that is saved in a database and referenced at step S2202 described above by the centralized monitoring system. The addition/update of the master registration information are the same as those described at S1011 of FIG. 10.

The master registration information includes a monitoring apparatus table 2301 and a monitor device table 2308. The monitored image forming apparatus is associated with the monitoring apparatus by the monitoring apparatus ID 2302 and 2309.

The monitoring apparatus table 2301 includes a monitoring apparatus ID 2302 for uniquely identifying a monitoring apparatus, a sales company ID 2303 for uniquely identifying a sales company, an IP address 2304 of a monitoring apparatus, the type 2305 of a monitoring apparatus (in this example, a local monitoring apparatus is "1" and an image forming device for directly sending information is "2"), monitoring schedule information 2306 (also referred to as schedule setting data), and a monitoring detail 2307 for indicating what kind of information is sent.

The monitoring device table 2308 includes a monitoring apparatus ID 2309 for uniquely identifying a monitoring apparatus, a device identifier 2310 for uniquely identifying an image forming apparatus, a MAC address 2311 that can uniquely identify an image forming apparatus, an IP address 2312, the type 2313 (indicating a complex machine/a printer) of an image forming apparatus, the model name 2314, and an offset value 2315 that is required for some models in counter collecting processing, which is a part of the monitoring processing, and that is a value which cannot be directly obtained from an image forming apparatus.

FIG. 23 will be described in further detail. For example, the apparatus indicated by the monitoring apparatus ID "ABC0110" is a local monitoring apparatus, monitoring three image forming devices of the device identifier "80mM5T96A", "80mM8D21N", and "80LL2U66L". The apparatus indicated by monitoring apparatus ID "80mM7Y37P" indicates an apparatus in which a local monitoring apparatus function is included in an image forming device, formally monitoring a single image forming device of the device identifier "80mM7Y37P".

Figure 24:
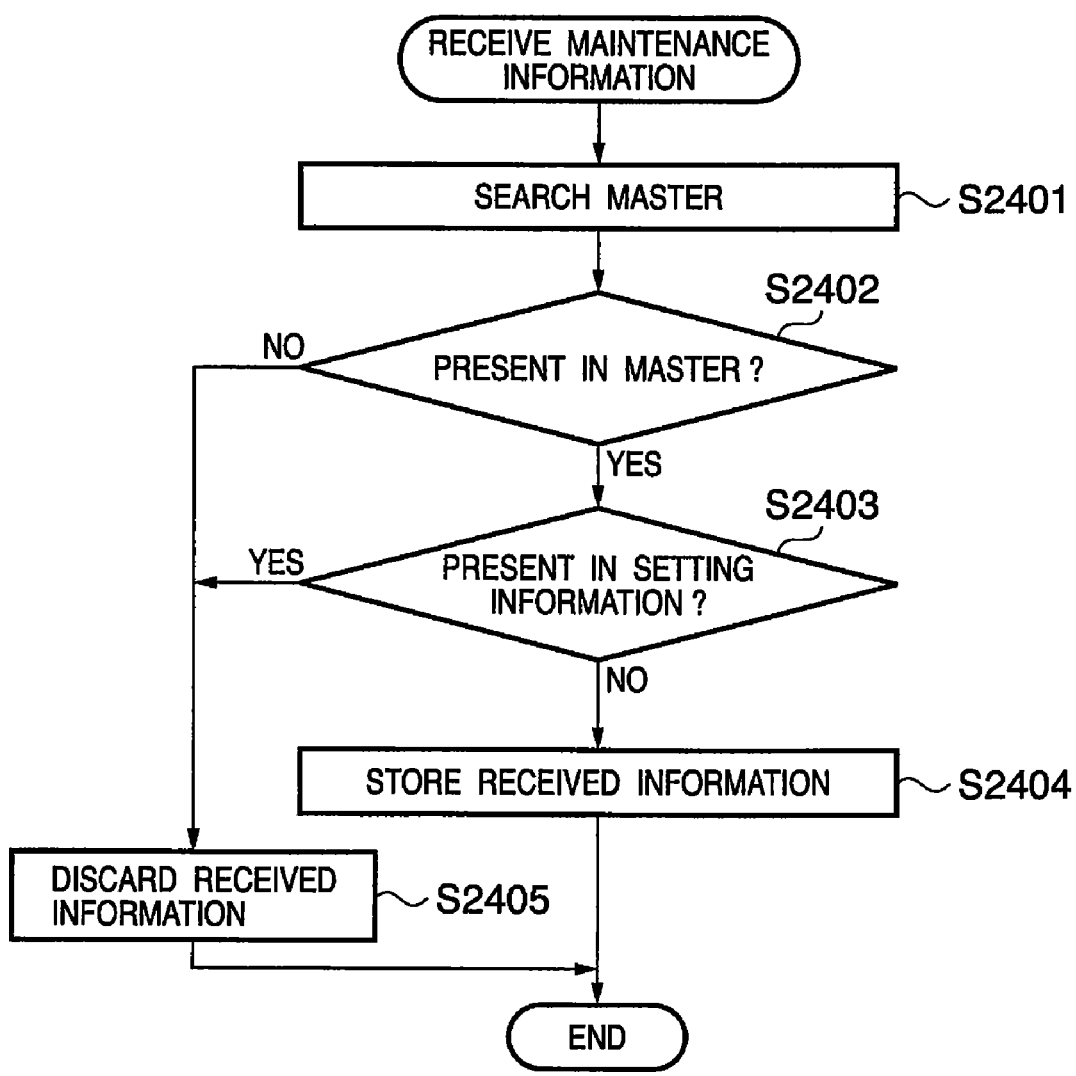
FIG. 24 is a flowchart for illustrating the processing of the centralized monitoring system 111 corresponding to the device's participation in a maintenance service and notification of maintenance information thereafter.

Next, processing of the centralized monitoring system 111 corresponding to the fact that the centralized monitoring system 111 determines "YES" in the step S2002 of FIG. 20 and replies <communication test result> to the device, and the device participates in a maintenance service so that it informs the centralized monitoring system 111 of maintenance information thereafter. FIG. 24 is a flowchart for illustrating the processing.

In response to reception of maintenance information such as counter information, failure information or the like from a remote device, the centralized monitoring system 111 determines whether the device identifier of the informing device is included in the master registration information in step S2401 or not. If it is determined "NO" in S2402, the centralized monitoring system 111 discards the received maintenance information in step S2405. If it is determined "YES" in step S2402, the centralized monitoring system 111 determines whether the device identifier of the informing device is included in the setting information saved as a history or not in step S2403. If it is determined "YES" in step S2403, the centralized monitoring system 111 discards the maintenance information received in step S2405. The processing cooperates with the deleting processing of FIG. 22 so that maintenance information is kept discarded until the setting information is deleted by the processing of FIG. 22. If it is determined "NO" in step S2403, the processing proceeds to step S2404 and stores the received maintenance information in the database at least in association with the device identifier.

Next, the processing of FIG. 25 will be described. In step S2501, the centralized monitoring system 111 receives the master changing information from outside such as a host 102 of FIG. 1, for example, and examines whether the device identifier included in the received master changing information is included in the master registration information. If it is determined "NO" in step S2502, the centralized monitoring system 111 registers the device identifier in the master registration information as a new device identifier and finishes the processing (step S2505).

If it is determined "YES" in step S2502, the centralized monitoring system 111 updates the associated master registration information based on the received master changing information in steps S2503 and S2504.

Figure 25:
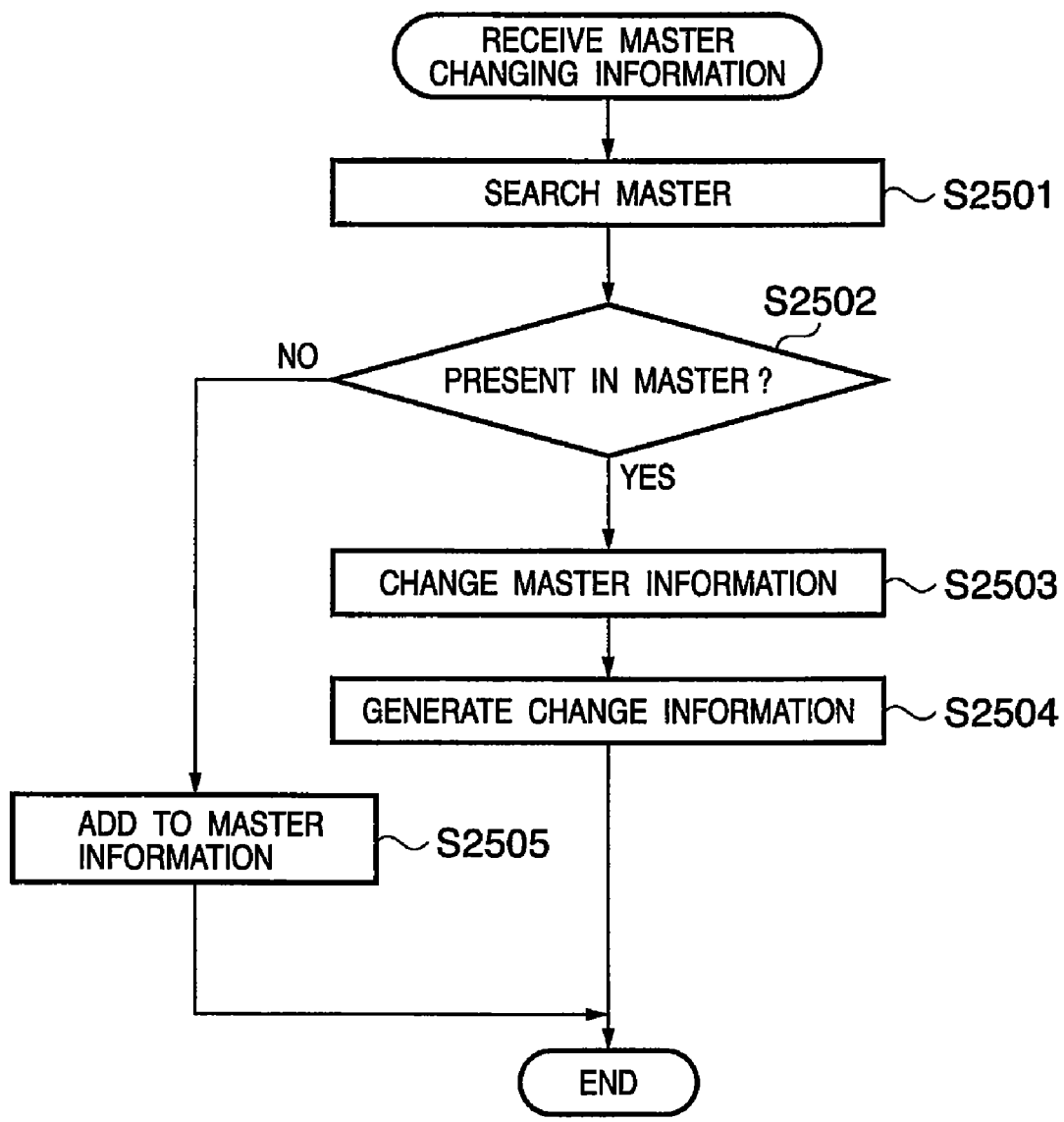
FIG. 25 is a flowchart for illustrating changing processing of master registration information.

FIG. 26 is a diagram showing an example of master changing information to be received by the centralized monitoring system in the processing of FIG. 25. FIG. 26 includes a change monitoring apparatus table 2601 and a monitoring device information list 2607.

The change monitoring apparatus table 2601 consists of a monitoring apparatus ID 2602 for uniquely identifying a monitoring apparatus, a sales company ID 2603 for uniquely identifying a sales company, a monitoring apparatus type 2604, a monitoring schedule information 2605, and monitoring detail 2606 indicating what kind of information is to be sent. The monitoring device information list 2607 consists of a monitoring apparatus ID 2608 for uniquely identifying a monitoring apparatus for monitoring the image forming apparatus, a device ID 2609 for uniquely identifying an image forming apparatus, a MAC address 2610 that can uniquely identify an image forming apparatus, an IP address 2611, the type of an image forming apparatus 2612 (the contents are the same as those of 2104 of FIG. 21), device name 2613 and an offset value 2614 (the contents are the same as those of 2112 of FIG. 21).

The IP address 2611, which changes according to customer's environment, is ignored as the setting information from the sales company hosts 102, 107 to the centralized monitoring system 111. The IP address 2611, which changes according to the sales company ID 1203 and customer's environment, is unnecessary information as information for changing setting to the local monitoring apparatuses 117, 122, 123 and the image forming apparatus 131. Thus, it is also ignored in processing.

In this example, setting of the monitoring apparatus ID "ABCD010", which has been registered in FIG. 23, is changed and the monitoring schedule is changed from "Weekly/05/0010" to "Daily/1200". As a monitored image forming apparatus, two devices of the model number "80mM5B11J" and "80mM5B13J" are added.

Figure 27:
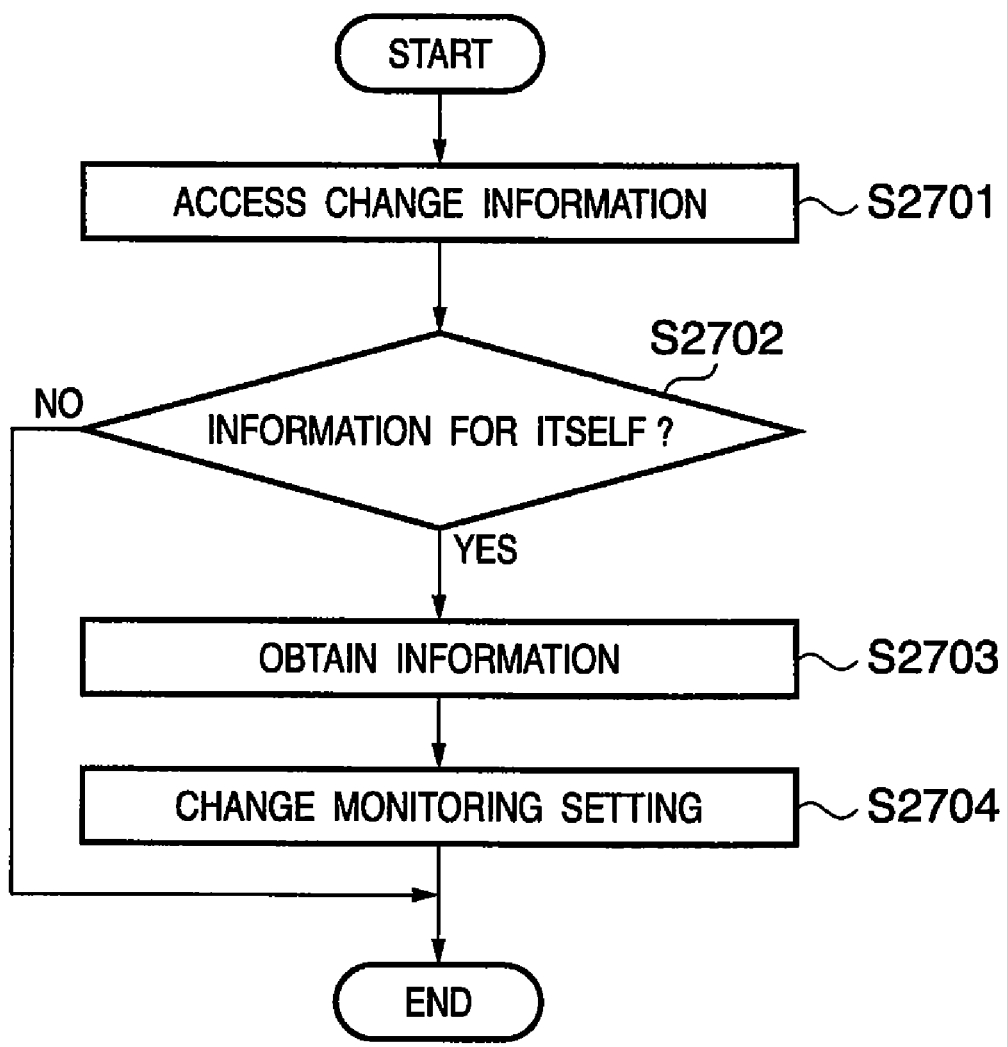
FIG. 27 is a flowchart showing obtaining processing of setting change information from the centralized monitoring system that the local monitoring apparatus or the image forming apparatus regularly executes.

FIG. 27 is a flowchart showing the obtaining processing of setting change information from the centralized monitoring system that the local monitoring apparatus or the image forming device regularly executes.

The local monitoring apparatus or the image forming apparatus accesses the centralized monitoring system 111 in step S2701 and obtains setting change information as shown in FIG. 26. In step S2702, the local monitoring apparatus or the image forming apparatus checks the presence of the monitoring apparatus ID 2602 of itself in the change monitoring apparatus table 2601. If the local monitoring apparatus or the image forming apparatus determines that the monitoring apparatus ID 2602 of itself is not present in step S2702, the local monitoring apparatus or the image forming apparatus finishes the processing. If the local monitoring apparatus or the image forming apparatus determines that the monitoring apparatus ID 2602 of itself is present in step S2702, the local monitoring apparatus or the image forming apparatus executes the processing of steps S2703 to S2704.

First, in step S2703, the local monitoring apparatus or the image forming apparatus obtains the change monitoring apparatus information table 2601 and the monitoring device information list 2607 of itself. In step S2704, the local monitoring apparatus or the image forming apparatus updates information for monitoring saved by it to the setting obtained in S2703 and executes the monitoring processing thereafter according to the updated setting.

In the description of FIG. 22 above, the setting information (a communication history including the device identifier) saved in the database does not particularly have an expiration date. The centralized monitoring system 111 may be adapted to determine whether the saved history reaches the expiration date or not, and if it is determined to reach the expiration date, delete the setting information.

If no notification of the device identifier from the device corresponding to the device identifier included in the saved setting information and the setting information is left as it is, unexpected matching is highly possible to occur. For example, if an operator of the host 107 does various types of settings including an erroneous device identifier via the Web browsers of FIGS. 12 and 13 and sets the setting in the master registration information, problem occurs when unexpected matching processing is done.

By providing the expiration date for a predetermined time period in the setting information, such a risk can be lowered.

According to the present invention, setting operation in the maintenance service can be done more correctly without needing to synchronize additional setting at the device side and setting for a device at the service center side.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-164868, filed on Jun. 3, 2005, which is hereby incorporated by reference herein in its entirety.

What is claimed is:

1. A centralized monitoring system for managing maintenance information of an image forming apparatus, comprising:

a database unit adapted to register a device identifier, as master information, the device identifier identifying a device including an image forming apparatus or a local monitoring apparatus that communicates with both the image forming apparatus and a server system;

an obtaining unit adapted to obtain a device identifier sent by the device;

a responding unit adapted to, in response to said obtaining unit obtaining the device identifier, respond to a notification source device so that the notification source device communicates maintenance information indicating an operation status of the image forming apparatus even if the obtained device identifier is not registered in said database unit; and a re-determination unit adapted to check again to determine whether the obtained device identifier is registered in said database unit again after it has once been determined that the obtained device identifier is not registered in said database unit.

2. The system according to claim 1, wherein said responding unit sends to the device schedule data for information notification from the device to said centralized monitoring system, in response to said obtaining unit obtaining the device identifier.

3. The system according to claim 2, further comprising:
a timing determination unit adapted to determine a notification timing included in the schedule data by using a random function, or determine the notification timing so as not to be the same as previously generated notification timings.

4. The system according to claim 1, further comprising:
a saving unit adapted to save a history of notification of the device identifier,
wherein said re-determination unit determines whether the device identifier included in the history saved in said saving unit is included in the master information or not.

5. The system according to claim 4, wherein whether an expiration date of history saved in said saving unit has been reached or not is determined, and if it is determined that the expiration date has been reached, the history is deleted.

6. The system according to claim 1, further comprising:
a warning processing unit adapted to execute warning outputting processing if said obtaining unit has not obtained the device identifier for more than a predetermined time period after the master information is registered in said database unit.

7. The system according to claim 1, further comprising:
a warning processing unit adapted to execute warning outputting processing if said re-determining unit has not confirmed registration of the device identifier in said database unit for more than a predetermined period.

8. The system according to claim 1, wherein if the device outputs a request for said centralized monitoring system within a predetermined time period, transition to power save mode is restricted in the device.

9. A control method of a centralized monitoring system for managing maintenance information of an image forming apparatus by using a database unit for registering a device identifier, as master information, the device identifier identifying a device including an image forming apparatus or a local monitoring apparatus that communicates with both the image forming apparatus and a server system, said method comprising:
an obtaining step of obtaining a device identifier sent by the device;
a responding step of, in response to the device identifier being obtained in said obtaining step, responding to a notification source device so that the notification source device communicates maintenance information indicating an operation status of the image forming apparatus even if the obtained device identifier is not registered in the database unit; and
a re-determination step of checking again to determine whether the device identifier is registered in the database unit again after it has once been determined that the obtained device identifier is not registered in the database unit.

10. The method according to claim 9, wherein said responding step includes sending to the device schedule data for information notification from the device to the centralized monitoring system, in response to the device identifier having been obtained.

11. The method according to claim 10, further comprising:
a timing determination step of determining a notification timing included in the schedule data by using a random function, or determining the notification timing so as not to be the same as previously generated notification timings.

12. The method according to claim 9, further comprising:
a saving step of saving a history of notification of the device identifier,
wherein said re-determination step includes determining whether the device identifier included in the history saved in said saving step is included in the master information or not.

13. The method according to claim 9, further comprising:
a warning processing step of executing warning outputting processing if the device identifier has not been obtained for more than a predetermined time period after the master information is registered in the database unit.

14. The method according to claim 9, further comprising:
a warning processing step of executing warning outputting processing if, in said re-determining step, registration of the device identifier in the database unit has not been confirmed for more than a predetermined period.

15. The method according to claim 9, further comprising the step of determining whether an expiration date of history saved in said saving step has been reached or not, and if the expiration date has been reached, deleting the history.

16. The method according to claim 9, wherein if a request for the centralized monitoring system is output by the device in a predetermined time period, transition to power save mode is restricted in the device.

17. A computer-readable medium storing a control program, for causing a computer to execute a control method of a centralized monitoring system for managing maintenance information of an image forming apparatus by using a database unit for registering a device identifier, as master information, that identifies a device including an image forming apparatus or a local monitoring apparatus that goes between said image forming apparatus and a server system, comprising:
an obtaining step of obtaining a device identifier sent by the device;
a responding step of, in response to the device identifier being obtained in said obtaining step, responding to a notification source device so that the notification source device communicates maintenance information indicating an operation status of the image forming apparatus even if the obtained device identifier is not registered in the database unit; and
a re-determination step of checking again to determine whether the device identifier is registered in the database unit again after it has once been determined that the obtained device identifier is not registered in the database unit.

18. A centralized monitoring system for managing maintenance information of an image forming apparatus, comprising:
a database unit adapted to register a device identifier, as master information, the device identifier identifying a device that includes an image forming apparatus or a local monitoring apparatus that communicates with both the image forming apparatus and a server system;
an obtaining unit adapted to obtain a device identifier sent from the device;
a responding unit adapted to, in response to said obtaining unit obtaining the device identifier, send device schedule data to a notification source device so that the notification source device communicates maintenance information indicating an operation status of the image forming apparatus, the device schedule data indicating a schedule for information notification from the device to said centralized monitoring system; and a warning processing unit adapted to execute warning outputting processing if said obtaining unit has not obtained the device identifier for more than a predetermined time period after the master information is registered in said database unit.

19. A control method of a centralized monitoring system for managing maintenance information of an image forming apparatus, the monitoring system including a database unit adapted to register a device identifier, as master information, the device identifier identifying a device that includes an image forming apparatus or a local monitoring apparatus that communicates with both the image forming apparatus and a server system, said control method comprising:

an obtaining step of obtaining a device identifier sent from the device;

a responding step of, in response to the device identifier being obtained in said obtaining step, sending device schedule data to a notification source device so that the notification source device communicates maintenance information indicating an operation status of the image forming apparatus, the device schedule data indicating a schedule for information notification from the device to the centralized monitoring system; and a warning processing step of executing warning outputting processing if the device identifier has not been obtained for more than a predetermined time period after the master information is registered in the database unit.

* * * * *